US006772146B2

(12) United States Patent
Khemlani et al.

(10) Patent No.: US 6,772,146 B2
(45) Date of Patent: Aug. 3, 2004

(54) WEBSITE FOR FINANCIAL INFORMATION

(75) Inventors: Sanjeev Khemlani, New York, NY (US); Adam Singer, New York, NY (US)

(73) Assignee: JPMorgan Chase Bank, NY (US)

( * ) Notice: Subject to any disclaimer, the term of this patent is extended or adjusted under 35 U.S.C. 154(b) by 287 days.

(21) Appl. No.: 09/851,790

(22) Filed: May 9, 2001

(65) Prior Publication Data

US 2002/0049713 A1 Apr. 25, 2002

Related U.S. Application Data

(60) Provisional application No. 60/203,344, filed on May 10, 2000, and provisional application No. 60/264,332, filed on Jan. 26, 2001.

(51) Int. Cl.[7] .............................................. G06F 17/30
(52) U.S. Cl. ..................... 707/3; 707/2; 707/9; 707/10; 707/1; 705/35; 705/36; 705/44
(58) Field of Search ............................ 707/1–3, 9–10; 705/35–36, 44

(56) References Cited

U.S. PATENT DOCUMENTS

| | | |
|---|---|---|
| 5,644,727 A | 7/1997 | Atkins |
| 5,689,651 A | 11/1997 | Lozman |
| 5,745,882 A | 4/1998 | Bixler et al. |
| 5,749,077 A | 5/1998 | Campbell |
| 5,819,263 A | 10/1998 | Bromley et al. |
| 5,819,284 A | 10/1998 | Farber et al. |
| 5,848,412 A | * 12/1998 | Rowland et al. ............... 707/9 |
| 5,893,079 A | 4/1999 | Cwenar |
| 5,913,202 A | 6/1999 | Motoyama |
| 5,995,947 A | 11/1999 | Fraser et al. |
| 6,014,638 A | 1/2000 | Burge et al. |
| 6,018,722 A | 1/2000 | Ray et al. |
| 6,049,783 A | 4/2000 | Segal et al. |
| 6,073,115 A | 6/2000 | Marshall |
| 6,128,602 A | * 10/2000 | Northington et al. .......... 705/35 |
| 6,327,628 B1 | * 12/2001 | Anuff et al. .................. 709/311 |
| 6,425,011 B1 | * 7/2002 | Otani et al. .................. 709/225 |

FOREIGN PATENT DOCUMENTS

WO 98/13778 4/1998

OTHER PUBLICATIONS

Flesner et al, US patent applicaiton No. 2002/0194267 A1, Dec. 19, 2002.*
Kawan et al, US patent applicaiton No. 2002/0128981 A1, Sept. 12, 2002.*

* cited by examiner

Primary Examiner—Greta Robinson
Assistant Examiner—Debbie M. Le
(74) Attorney, Agent, or Firm—Dickstein, Shapiro, Morin & Oshinsky, LLP.

(57) ABSTRACT

A system for retrieval and display of financial information to a plurality of users is disclosed. The users are provided with a portal display page which can be customized by the users to include one or a plurality of independently functioning display modules. Each display module may be populated with a different type of information. The information provided in each module may be customized by the users.

17 Claims, 43 Drawing Sheets

Peer Group Stocks 1016

Peer Group ▽ Go  Get Quote by Symbol [ ] Go  Select View  Default ▽  🔧 ?

| | Symbol | Last Price | Net Change | Low | High | Volume | P.E |
|---|---|---|---|---|---|---|---|
| ☐ | CMB | 56 11/16 | -0 7/16 | 56 3/8 | 58 1/4 | 3.398.400 | 9.10 |
| ☐ | GS | 132 | +3 3/16 | 126 11/16 | 132 7/8 | 994.500 | 21.50 |
| ☐ | MER | 73 1/2 | +1 1/2 | 72 1/2 | 74 5/8 | 1.446.200 | 19.12 |
| ☐ | MWD | 109 3/16 | +2 1/4 | 107 3/16 | 109 15/15 | 1.537.800 | 24.36 |
| ☐ | JPM | 167 9/16 | +7 5/8 | 167 1/2 | 172 | 1.929.700 | 14.37 |
| ☐ | C | 55 5/8 | -1 15/16 | 55 | 57 1/2 | 16.025.200 | 22.12 |
| ☐ | LEH | 151 3/4 | +4 3/8 | 148 3/8 | 154 1/2 | 921.800 | 13.46 |
| ☐ | BSC | 70 9/16 | +2 1/8 | 68 7/16 | 71 | 849.700 | 13.39 |
| ☐ | DBKA.CD | - | - | - | - | - | - |
| ☐ | UBS | 144 3/8 | -1 7/8 | 144 5/16 | 145 3/4 | 14.400 | 15.36 |

1020

Make Graph (check boxes for comparative charting)  Add to watchlist [ ] Add

| Detail: Chase Manhattan Stock (NYSE:CMB) 4:07pm | | | |
|---|---|---|---|
| Last Price | 47 3/4 | Today's Open | 48 5/8 |
| Net Change $ | +1/16 | Today's High | 48 5/8 |
| Net Change % | 0.13% | Today's Low | 46 1/5 |
| Volume | 513.600 | Previous | 47 13/16 |
| 52 Week High | 54 1/2 | 52 Week Low | 54 1/2 |
| | APR.22.99 | | APR.22.99 |
| Bid | 47 3/4 | Ask | 47 13/16 |
| Market Cap | $1.088 | Trend | ●◀◀●▶▶●▶ |
| | | Shares Outstanding | 75.863.000 |
| Beta | 1.17 | P/E Ratio | n/a |
| Historical P/E | 14 | Consensus P/E | 15 |
| Annual Dividend | 0.00 | Earnings Per Share | -3.88 |
| Yield | n/a | S&P Rating | n/a |
| Time and Sales Report  Intraday Chart  News Headlines  Research | | | |

Intraday Chart Icon

FIG. 2aaa

```
News Search                                              [?]
Search Chase News       [            ]────── 1038
News Source             [All News Sources  ▽]── 1040
Set the search criteria above and click (Go)

Search Results                                    6 Results
```

- =DJASK SMARTMONEY: The ABCs Of OTC
  Top management from Chinese forestry investor Ctic and Fletcher Challenge are to meet in bejing next
  week in a big to resolve a dispute over New Zealand's largest forestry plantation...
  |Dow Jones News Service, 4:13.00  7.00pm|

1042

- Community West Sees '00 Net At 57-78c/Shr With Writedown
  Top management from Chinese forestry investor Ctic and Fletcher Challenge are to meet in bejing next
  week in a big to resolve a dispute over New Zealand's largest forestry plantation...
  |Review England News Service, 4:13.00  7.00pm|

1036

- Alberta Securities Commission - Interim Cease Trade Order
  Top management from Chinese forestry investor Ctic and Fletcher Challenge are to meet in bejing next
  week in a big to resolve a dispute over New Zealand's largest forestry plantation...
  |New Zealand News Service, 4:13.00  7.00pm|

- DJ Switchboard IPO Set At 5.5M Shares, $10-$12 A Share
  Top management from Chinese forestry investor Ctic and Fletcher Challenge are to meet in bejing next
  week in a big to resolve a dispute over New Zealand's largest forestry plantation...
  |MSNBC News Service, 4:13.00  7.00pm|

- =DJASK SMARTMONEY, The ABCs Of OTC
  Top management from Chinese forestry investor Ctic and Fletcher Challenge are to meet in bejing next
  week in a big to resolve a dispute over New Zealand's largest forestry plantation...
  |Dow Jones News Service, 4:13.00  7.00pm|

- Community West Sees '00 Net At 57-78c/Shr With Writedown

FIG. 2ac

Bond Watchlist

| Issuer | Coupon | Curr | Maturity | Bid Price | Bid Spr* | Mdy | C&P | Last Price Date |
|---|---|---|---|---|---|---|---|---|
| J.P.MORGAN | 5.750 | USD | 2/25/04 | - | 82 | An3 | AA- | 5/3/01 |
| CHASE | 5.750 | USD | 4/15/04 | - | 82 | An3 | AA- | 5/3/01 |
| CHASE | 6.750 | USD | 12/1/04 | - | 85 | An3 | AA- | 5/3/01 |
| CHEVY CHASE BANK | 9.250 | USD | 12/1/05 | 99.25 | 468 | B1 | B+ | 5/2/01 |
| 360NETWORKS | 13.000 | USD | 5/1/08 | 17.00 | 7488 | B3 | B | 5/2/01 |
| 360NETWORKS | 13.000 | EUR | 5/1/08 | 10.00 | 9999 | B3 | B | 5/2/01 |
| CHEVY CHASE BANK | 9.250 | USD | 12/1/08 | 98.75 | 440 | B1 | B+ | 5/2/01 |
| J.P.MORGAN | 8.000 | USD | 1/15/09 | - | 123 | A1 | A+ | 5/3/01 |
| CHASE | 8.000 | USD | 2/15/09 | - | 126 | A1 | A+ | 5/3/01 |
| 360 COMMUNICATIONS | 7.600 | USD | 4/1/09 | - | 210 | A2 | A | 5/3/01 |

Get Bond by Issuer [Go]

Advanced Search

FIG. 2b 1092  1094  1096

| FX Rates | | | | 🔧 🔍 📊 ? |
|---|---|---|---|---|
|  | USD | GBP | JPY | EUR |
| USD | 1 | 1.664 | 0.009 | 1.077 |
| GBP | 0.601 | 1 | 0.005 | 0.647 |
| JPY | 105.5 | 177.1 | 1 | 114.7 |
| EUR | 0.928 | 1.545 | 0.008 | 1 |

1090

Spot Rates | Cross Rates 218  1098  1100

FIG. 2e 1112  1114

| Useful Links | 🔧 🔍 ? |
|---|---|

- Beacon Group
- Bear Stearns
- Chase Manhattan Bank
- Citigroup
- Deutsche Bank

Market Commentary

Morning Call
Morning Call, 06/28/00 12:00PM
On the call: Greg Batey; Robin Marshall, Senior Western Europe Analyst, London; Giancarlo Parasso, Eastern Europe Analyst, London; Jim Glassman, Senior U.S. Economist, New York; Graham Stock, Latin America Analyst, New York [Play Clip-Internal | Play Clip-External | Details]

Morning Call
Morning Call, 06/28/00 12:00PM
On the call: Jim Glassman, Senior U.S. Economist, New York; Robin Marshall, Senior western Europe Analyst, London; Michael Marrese, Eastern Europe Analyst, London; Amy Auster, New York [Play Clip-Internal | Play Clip-External | Details]

FIG. 2g

Detail: Foreign Exchange LIBOR Fixings — 1126

Prices delayed based on exchange requirements

LIBOR Fixings | Treasury

| Currency | Last | Year High | Year High Date | Year Low | Year Low Date |
|---|---|---|---|---|---|
| LIBOR USD 1MTH | 6.62000 | 6.68438 | 28 JUN 2000 | 5.75125 | 10 JAN 2000 |
| LIBOR USD 2MTH | 6.64000 | 6.76375 | 01 JUN 2000 | 5.90500 | 10 JAN 2000 |
| LIBOR USD 3MTH | 6.66000 | 6.86875 | 01 JUN 2000 | 6.02625 | 10 JAN 2000 |
| LIBOR USD 6MTH | 6.78000 | 7.10875 | 31 MAY 2000 | 6.18125 | 10 JAN 2000 |
| LIBOR USD 1YR | 6.87750 | 7.50125 | 04 MAY 2000 | 6.75125 | 05 JAN 2000 |
| LIBOR GBP 1MTH | 6.08625 | 6.25000 | 04 MAY 2000 | 5.69031 | 14 JAN 2000 |
| LIBOR GBP 2MTH | 6.15281 | 6.31094 | 04 MAY 2000 | 5.93500 | 14 JAN 2000 |
| LIBOR GBP 3MTH | 6.21703 | 6.37313 | 16 MAY 2000 | 6.07594 | 14 JAN 2000 |
| LIBOR GBP 6MTH | 6.31313 | 6.52500 | 20 JAN 2000 | 6.28141 | 17 JUL 2000 |
| LIBOR GBP 1YR | 6.47484 | 6.88766 | 28 AUG 2000 | 6.43688 | 14 JUL 2000 |
| LIBOR DEM 1MTH | 4.70438 | 4.78000 | 28 AUG 2000 | 3.10313 | 19 JAN 2000 |
| LIBOR DEM 2MTH | 4.78563 | 4.83375 | | 3.20000 | 19 JAN 2000 |

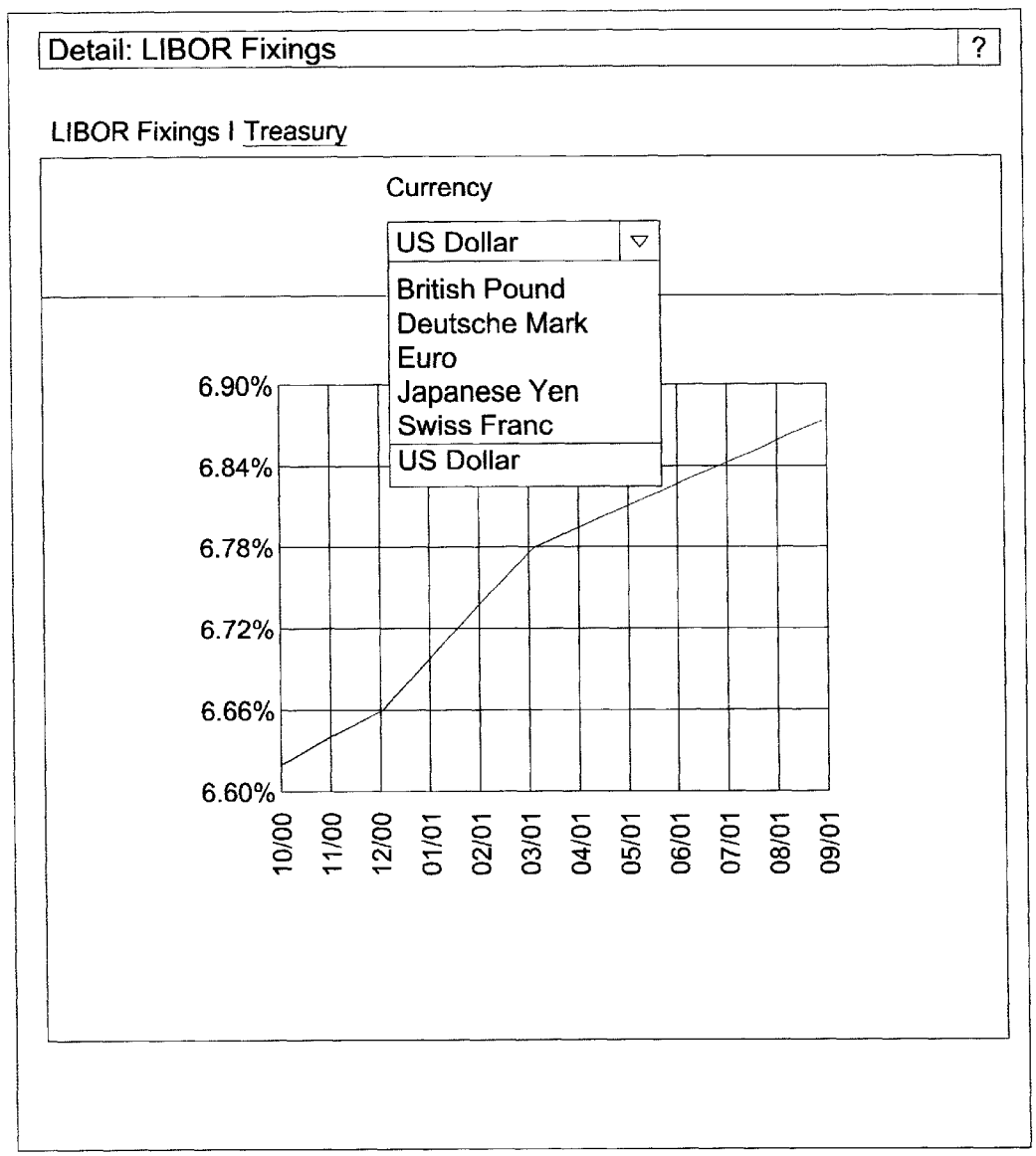
FIG.2jaa

Detail: LIBOR Fixings — 1134

LIBOR Fixings | Treasury — 1132

| Treasury | Yield | Last | Bid | Ask | Maturity | Coupon |
|---|---|---|---|---|---|---|
| UST 3 MTH | 6.1196 | 5.975 | 5.950 | - | 07 DEC 2000 | - |
| UST 6 MTH | 6.236 | 5.985 | 5.970 | 5.950 | 08 MAR 2001 | - |
| UST 1 YR | 6.2041 | 5.835 | - | 5.845 | 30 AUG 2001 | - |
| UST 2 YR | 6.1277 | 100 1/32 | 99 127/128 | 100 1/64 | 31 AUG 2002 | - |
| UST 5 YR | 5.9654 | 103 9/32 | - | 103 11/64 | 15 MAY 2005 | - |
| UST 10 YR | 5.7681 | 100 3/32 | 99 55/64 | 99 57/64 | 15 AUG 2010 | - |
| UST 30 YR | 5.7238 | 107 51/64 | - | - | 15 MAY 2030 | - |

FIG.2jb

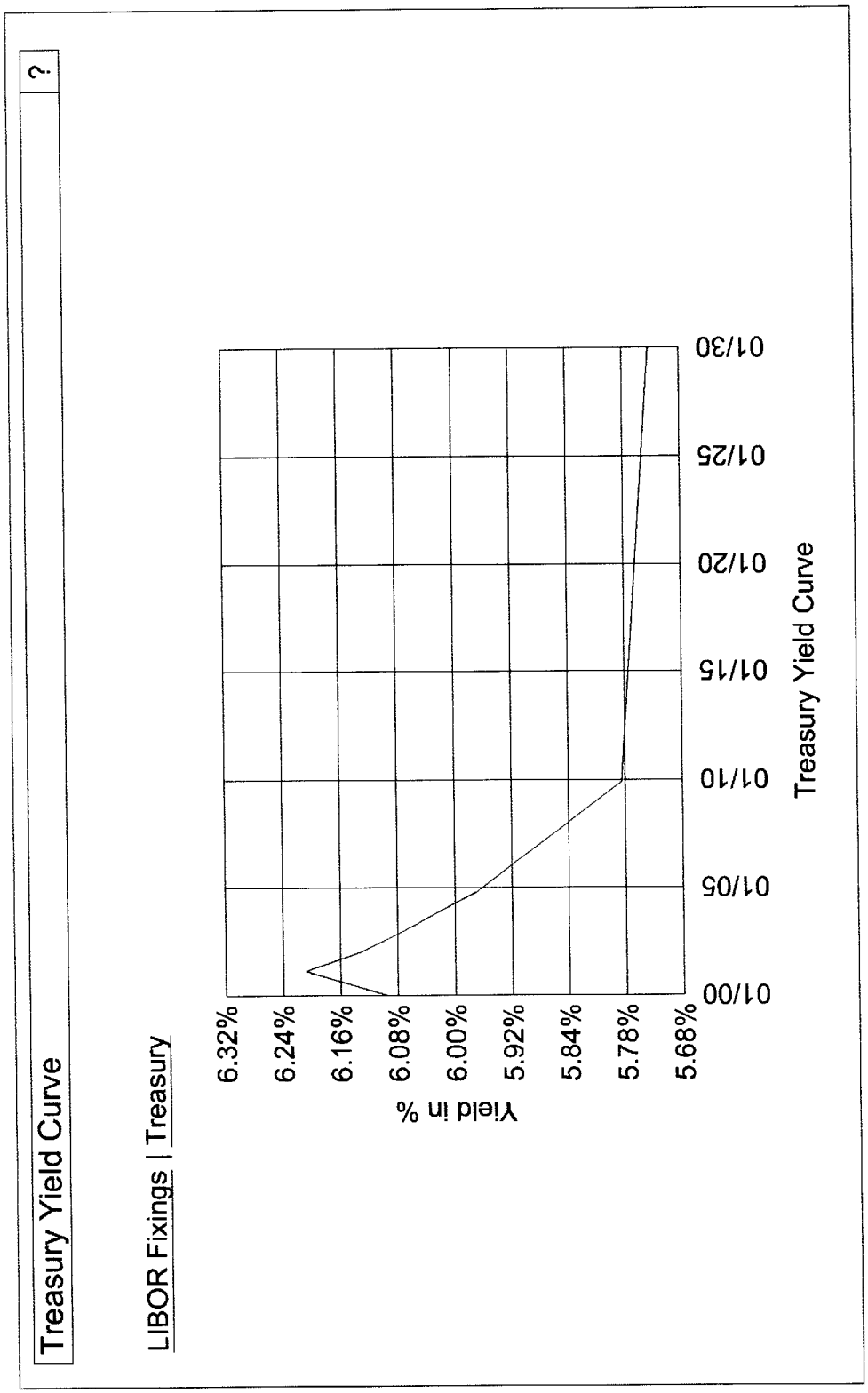
FIG.2jba

| Commercial Paper Statement | | Program Name | Chase Manhattan Bank | ▷ | ⌕ ? Go |
|---|---|---|---|---|---|

| | | | |
|---|---|---|---|
| OUTSTANDING ON 01/01/99 | $ 29,000 | TOTAL NO. OF TRANS. | 277 |
| TOTAL VOLUME | $ 9,079,700 | AVG. AMT. PER TRANS. | $ 32,778 |
| TOTAL MATURED | $ 9,108,700 | WTD. AVG. MATURITY | 1 |
| NET INCREASE/DECREASE | ($ 29,000) | NO OF INVESTORS | 94 |
| OUTSTANDING ON 02/01/00 | $ 0 | AVG. VOLUME INVESTOR | $ 91,893 |
| WTD AVG. RATE FOR PERIOD | $ 4,944 | AVG. TRANS. INVESTOR | 5 |
| WTD AVG. YIELD EQUITY RATE | $ 4,944 | | |

Distribution by Maturity, Geography, Account Type | Advanced Search

FIG.2k

| Financial Glossary | ? |

Search by keyword: [        ] (Go)  ~1190
Browse by letter: A B C D E F G H I J K L M N O P Q R S T U V W X Y Z

| Browsing |   AAA   ~1196

Browsing AAA through acc
- AAA
- AA
- abandon
- abeyance
- ability to pay
- absolute priority rule
- absorbed
- absorption rate
- abstract of title
- abusive tax shelter
- Accelerated Cost
- Recovery system
- (ACRS)
- accelerated
- depreciation
- acceleration
- accidental death benefit

1192

The highest rating giving by bond rating agencies, indicating that the bond is a very safe investement

1194

More,,,

FIG. 2pa     1188

Advanced Search: Global Investor News [?]

Select Financial Market(s):     Select News Category(s):

1206     1208

| All Markets | All Categories |
| Argentina | Cash & Foreign Exchange - CFX |
| Australia | Civil Disruption - CIV |
| Austria | Cleaning - Settlement & Registration - SET |
| Bahrain | General - GEN |

1202

Select Period: [All News Period ▽]    Sort by: ○ Market ○ Data    [Submit]

Detail: World Market News

Returning Results 1-46 of 46    1210   1212   1214     1216
Page 1 of 5

1204

- CHILE (HOL) - June Holiday Changes
  [3/30/00]
- COLOMBIA (TAX) - Debit Tax Removed
  [3/29/00]
- EQUADOR (HOL/TRD/SET) - May Business Holiday Revised
  [3/29/00]
- FRANCE (GEN) - Merger of BNP and Panbar Confirmed
  [3/29/00]
- CHILE (HOL) - June Holiday Changes
  [3/30/00]
- COLOMBIA (TAX) - Debit Tax Removed
  [3/29/00]
- EQUADOR (HOL/TRD/SET) - May Business Holiday Revised
  [3/29/00]
- FRANCE (GEN) - Merger of BNP and Panbar Confirmed
  [3/29/00]
- EQUADOR (SET) - Dematerialization of Goverment Bonds
  [3/29/00]

Next | Page 1 | 2 | 3 | 4 | 5

Contact

To send a message, check off boxes to mark message recipient. Then, fill out the fields below and click the "Send" button. Please note your Primary Client Member, designated by a (p), will be automatically cc'd on all correspondence.

| General | Media & Telecom | Mergers & Acquistions |
|---|---|---|
| ☑ Geoff | ☐ Sean | ☐ John |
| ☐ Peter | ☐ Mildred | ☐ Alex |
| ☐ Indira | ☐ Reginald | ☐ Richard |
| ☐ Elizabeth | | ☐ Alisande |
| | Media & Telecom | ☐ Janet |
| | ☐ Roger | |
| | ☐ Noriko | |

315 — 305 — 310

Subject: [            ]

[                    ]

Clear | Send — 340

Geoff, Vice Chairman, Institutional Finance
 tel    work Park Avenue
 fax         New York, NY
 home  10017
 fax    home n/a
              n/a                    email

Customization: Fixed Income, Economic & Other Research [?]

Search in: Equities ▽ —402
All Exchanges ▽ —404
All Currencies ▽ —406
Enter Keyword: [ ] (Go) —408

Search Results — 34 results

| RJC | Description | Exchange | Currency |
|---|---|---|---|
| IBM pa TH | IBM PR A | THM | USD |
| IBM pa MN | IBM PR A | MD | USD |
| IBM pa | IBM PR A | NYQ | USD |
| IBM pa N | IBM PR A | NYS | USD |
| IBM pa P | IBM PR A | PSE | USD |
| IBM pa C | IBM PR A | CN | USD |
| IBM pa PH | IBM PR A | XPH | USD |
| IBM MN | IBM STK | MD | USD |
| IBM TH | IBM STK | THM | USD |
| IBM | IBM STK | NYQ | USD |
| IBM N | IBM STK | NYS | USD |
| IBM B | IBM STK | BOS | USD |
| IBM C | IBM STK | CN | USD |

FIG. 4

Customization: Edit Client Team Advice

716 — Select the user's company.
[Chase Manhattan ▼]

714

Select the user to communicate with.
Hold Ctrl and click to add multiple recipients.

718 —
| John |
| Alex |
| Adam |
| John |
| Alex |
| Adam |
| John |

Edit the text to be posted to the user's Portal page.
If you leave this space blank, a "Tip of the Day" will be used instead

720 —
[                              ]

Enter the date to stop displaying the above text.
722 — [04] / [01] / [00]

Click the "Update Client Team Advice" button
[Update Client Team Advice]
724 —

FIG. 7a

Customization: Equity Watchlist ?

Do you want to create, edit or delete a watchlist?
[Edit Existing Watchlist ▽] ～730

Select the watchlist to edit
[John's Personal Stocks ▽] ～732

Edit this watchlist's name, as needed
[John's Personal Stocks ▽] ～734

Edit symbols in this watchlist
Click the "Look-Up" icon to help populate the fields

1 [JPM] 🔍
2 [IBM] 🔍
3 [DELL] 🔍
4 [ ] 🔍
5 [ ] 🔍
6 [ ] 🔍
7 [ ] 🔍
8 [ ] 🔍

[Submit] ～740

Customization: Edit Bond Watchlist

Issuer Name

Maturity Range (Years)
[0] to [88]

Country
Algeria
Argentina
Brazil

Moody's Rating
[AAA▷] to [NR▷]    756a  756b

Currency
Bradys
Eurodollars
Great Britain Pounds    760

Coupon Range (%)
[0.000] to [20.000]    757a  754a  754b

S & P Rating
[B▷] to [NR▷]    757b

Industry
Aerospace & defense
Airlines
Auto & Auto Parts    762

Hold Ctrl and click to select multiple elements in the three boxes above.

Set the search criteria above and click (Go)

Search Results
Click "Add" button to add to watchlist

CHASE MANHATTAN          [Add]
UNITED TECHNOLOGIES      [Add]
WHICH ARE REALLY
IBM                      [Add]

Current Bond Watchlist
Click checkbox to remove from watchlist

☐ CHASE MANHATTAN

☐ UNITED TECHNOLOGIES

☐ SUPER INTERESTING
   COOL TECHNOLOGY INC

When finished updating Bond Watchlist, click   Update [Update]

FIG. 7c

Customization: Commercial Paper [?]

Use this interface to assign programs to users.

Select the company.
[Chase Manhattan Bank ▽] ~ 802

Select the user.
[Bob ▽] ~ 804

Select programs to assign to this user.

806 —
- ☐ CMB - Chase Manhattan Bank, Inc,
- ☐ CMBI - Chase Manhattan Bank, Inc,
- ☐ DRC - Diatom Regulatory
- ☐ DTR - Direct Trade Ltd.
- ☐ CMB - Chase Manhattan Bank
- ☐ CMBI - Chase Manhattan Bank, Inc,
- ☐ DRC - Diatom Regulatory
- ☐ DTR - Direct Trade Ltd.
- ☐ CMB - Chase Manhattan Bank
- ☐ CMBI - Chase Manhattan Bank, Inc,
- ☐ DRC - Diatom Regulatory
- ☐ DTR - Direct Trade Ltd.

800

Select the default program.
[Select a program ▽] ~ 808

Select the default data range to present.
[Last Month ▽] ~ 810

[Submit]
812

FIG. 7f

Customization: Module Control Board

Click radio buttons to set permissions.
Clicking the checkbox marked "off" will disable the module to all users.
USE WITH CAUTION!

| Module Name | Abbreviation | Public | Private | 844 Off | Req'd |
|---|---|---|---|---|---|
| Bond Watchlist | BOWL | ◉ | ○ | ☐ | ☑ —846 |
| Chase Team Advice | CTA | ◉ | ○ | ☐ | ☑ |
| Commercial Paper Statement | CP | ◉ | ○ | ☐ | ☑ |
| Current Research | CRES | ◉ | ○ | ☑ | ☐ |
| Equity Research | EQRS | ◉ | ○ | ☐ | ☑ |
| FX Rates | FXRT | ◉ | ○ | ☑ | ☐ |
| Financial Glossary | GLOS | ◉ | ○ | ☑ | ☑ |
| Fixed Income Research | FIRS | ◉ | ○ | ☐ | ☑ |
| Global Investor News | MKTF | ◉ | ○ | ☑ | ☐ |
| Industry News | MYNW | ◉ | ○ | ☐ | ☑ |
| Intraday Prices | INTD | ◉ | ○ | ☐ | ☑ |
| JP Morgan Multimedia | JPMM | ◉ | ○ | ☐ | ☑ |
| Market Watch | MKTW | ◉ | ○ | ☑ | ☐ |
| Morgan Markets Research | MMRS | ◉ | ○ | ☑ | ☑ |
| MorganWise Research | MWRS | ◉ | ○ | ☑ | ☐ |
| Peer Group Stock Watchlist | EQWL | ◉ | ○ | ☐ | ☑ |
| Syndicated Loan Market | GSFI | ◉ | ○ | ☑ | ☐ |
| Treasusy Yield Curve | LITR | ◉ | ○ | ☐ | ☑ |
| Useful Links | ULNK | ◉ | ○ | ☐ | ☑ |
| eCare | ECAR | ◉ | ○ | ☐ | ☑ |

Click "Save Changes" to set module permissions.
Save Changes
848

FIG. 8            838

Customization: Distribute Private Modules

Use this interface to control user' access to private modules.

Select a company.
[J.P. Morgan Chase & Co. ▽] — 852

Select user.
[AP. Bus ▽] — 854

Click boxes for the modules to be permitted to this user. Grayed-out boxes are "public" and cannot be restricted.

856 —
- ☑ Peer Group Stock Watchlist
- ☑ Bond Watchlist
- ☑ Current Research
- ☑ JP Morgan Multimedia
- ☑ Industry News
- ☑ Chase Team Advise
- ☑ Intraday Prices
- ☑ Treasury Yield Curve
- ☑ Market Watch
- ☑ FX Rates
- ☑ Useful Links
- ☑ Financial Glossary
- ☑ Syndicated Loan Market
- ☑ Global Investor News
- ☑ Comercial Paper Statement
- ☑ Equity Research
- ☑ Fixed Income Research
- ☑ eCare
- ☑ Morgan Markets Research
- ☑ MorganWise Research Click the "Save Permissions" button to finish

[Save Permissions] — 858

WEBSITE FOR FINANCIAL INFORMATION

CROSS REFERENCE TO RELATED APPLICATIONS

This application is based on U.S. Provisional Application No. 60/203,344 filed on May 10, 2000, entitled WEBSITE FOR FINANCIAL INFORMATION and U.S. Provisional Application No. 60/264,332, filed Jan. 26, 2001, entitled WEBSITE FOR FINANCIAL INFORMATION, the entire disclosures of which are hereby incorporated by reference.

BACKGROUND

The present invention generally relates to an information service for providing financial information to issuers, and particularly relates to a comprehensive financial information service on the World Wide Web ("Web"), which includes a content display web page for displaying a plurality of customizable pre-selected sets of information.

In recent years, financial information has become more and more available due to the increase in the number of financial information service providers establishing informational sites on the Web. Investors, and issuers, routinely face the time consuming task of finding relevant information from among the overwhelming amount of information that is provided by the various information services. For example, the investors must engage in the time consuming search of databases in order to compile a listing of the desired information. This makes monitoring of, for example, trends in stock prices for one or a group of stocks a time consuming task. Such expenditure of time adversely affects the timely availability of information which may be crucial in decision-making. Therefore, it is desirable to have a financial service that reduces the time required for the search of financial information.

An object of this invention is to reduce the time that is required for finding financial information from among various information services, such as on-line news services, information services and financial databases.

Another object of this invention is to devise a single information service for providing access to a plurality of on-line news services, information services and financial databases in order to reduce the time that is required for finding information from various information sources.

Yet, another object of this invention is to devise an information service whereby the issuer can pre-select sets of information from, for example, selected financial information services such as databases to further reduce the time that an issuer spends on finding information each time the investor accesses the financial information service of the present invention.

SUMMARY OF THE INVENTION

The present invention is a method and a system for providing financial information from various information sources via a network of computers such as the Internet, wherein the provided information is selected and retrieved from the various financial sources based on pre-selected sets of parameters, the parameters being selectable on a shared basis between two users, such that one user may pre-select one or more set of parameters for another user.

What is disclosed as an embodiment of the invention is a financial information system for providing information to a user on a display terminal connected to a network of computers, which includes: an information source; a customization database containing records having pre-selected parameters for retrieval of information from the information source; and a processor connected to the network that sends the selected and retrieved information to the display terminal. In the disclosed system, the parameters for selection and retrieval of information from the information source can be pre-selected by at least two users on a shared basis. This means that the system allows the parameters to be pre-selected by one user for retrieval of information from the information source to be displayed in the display terminal for another user.

The system allows for the creation and storage of a plurality of such parameters. The parameters are stored in a customization database, and may be named by users and retrieved by their names. In the disclosed system, the retrieved information is displayed in independently functioning display module which are included in a web page. Some of the information display modules include a function which allows at least two users to pre-select parameters for retrieval of information from the information source on a shared basis.

BRIEF DESCRIPTION OF THE DRAWINGS

The above, and other objects, features and advantages of the present invention will become apparent from the following description read in conjunction with the accompanying drawings in which like reference numerals designate the same elements.

FIG. 3 shows a module for composing a message inside the system according to the invention.

FIG. 4 shows a search module according to an aspect of the invention.

FIGS. 7a–7h show customization windows for the information display modules according to an aspect of the embodiment of the invention.

FIG. 8 shows a customization control window for setting the steps of accessibility of each information display module.

FIG. 9 shows a customization control window for distributing access rights to users to restricted information display modules on an individual basis.

DETAILED DESCRIPTION OF THE PREFERRED EMBODIMENT

Figure 1:
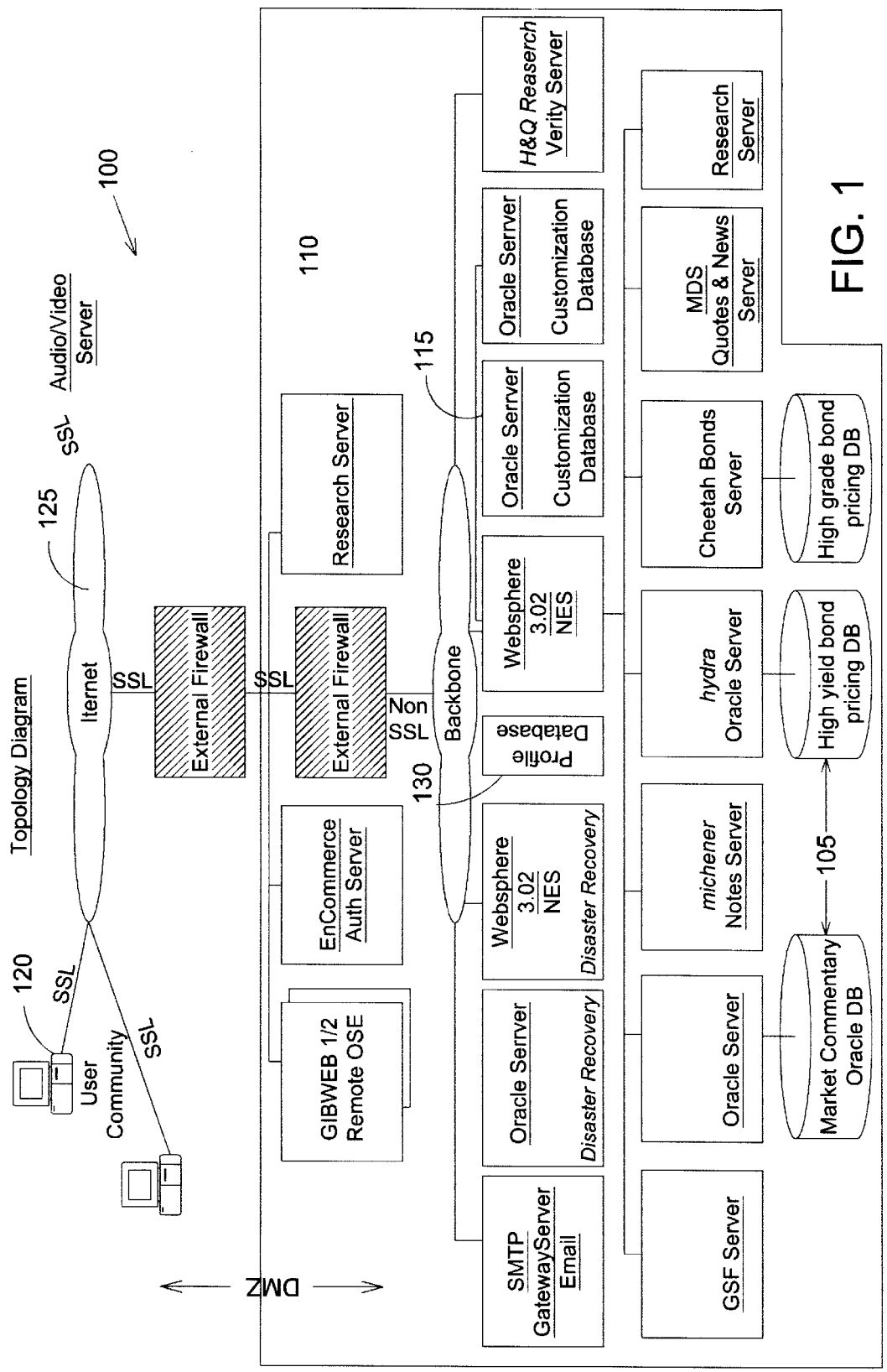
FIG. 1 is a diagram showing the structure of the system embodying the instant invention.

The elements of the information system 100 according to the invention are shown in FIG. 1. At the center of system 100 is a processor 110 that hosts the website of the present invention. As known to those skilled in the art, the processor 110 can be constituted by a plurality of processors acting as servers (e.g., application servers, database servers . . . ) Coupled to the processor 110 are a plurality of information sources 105. These sources include internal proprietary databases, external databases and external online information services from which information can be gathered and passed onto the users through the processor 110. Examples of external information sources include Bloomberg™, Standard and Poors™ (S&P), and Dow Jones™. The processor 110 is coupled to the external information sources 105 either through the Internet 125, dial up connection or a private value added network (VAN). Internal information sources 105 include, for example, a foreign exchange (FX) database containing current rates and terms for processing foreign exchange requests. The processor 110 is coupled to the internal information sources 105 either through direct connection or through a corporate intranet.

A customization database 115 is also coupled to the processor 110. The customization database 115 stores records containing pre-selected parameters (Custom Records) that are used to select and retrieve information from the information sources 105 as is further described below. The retrieved, customized information is then displayed by an information display module provided in a portal web page for each user as will be described in detail below.

A separate user profile database 130 is illustrated in FIG. 1. A user profile is maintained in user profile database 130 for each authorized user. Each user profile preferably includes a user name and password for each user. A user accesses the web site hosted on processor 110 using his/her respective user name and password. The user profiles contained in database 130 preferably also include the name of the company with which the authorized user is affiliated. In an alternative embodiment, the customization database 115 and the user profile database 130 are combined into a single database.

End users employ end user terminals 120 to connect to processor 110. In a preferred embodiment, the connection between the end user terminals 120 and processor 110 is made through the Internet 125, but any other connection can be used such as a corporate intranet, a VAN or a direct dial line. As shown in FIG. 1, it is well known to those skilled in the art that the connection between the end users and processor 110 includes a firewall and other hardware and software security measures to ensure that unauthorized users (hackers) do not gain access to processor 110. In a preferred embodiment, the workstation 120 is a Personal Computer (PC) loaded with an Internet browser such as Netscape™ Navigator™ or Microsoft™ Internet Explorer™. In alternative embodiments, the user can access system 100 through Internet 125 using any Internet ready device such as a web enabled Personal Digital Assistant (PDA) such as a Palm Pilot™, a cell phone or an interactive TV.

The web site hosted on processor 110 is administered by an administrator, that in a preferred embodiment is an entity such as an investment bank or other financial institution. The web site is made accessible only to authorized users. The authority to access the web site is granted by the administrator of the web site. The authorized users include authorized internal users and authorized external users. An authorized external user is an end user of the web site who has been granted access to the web site. For example, an authorized external user is a client of an investment bank administrating the web site.

An authorized internal user is an employee or agent of the web site administrator who is authorized to access the web site. The authorized internal users can be, for example, financial analysts or investment bankers that manage the accounts of the clients of the investment bank. An authorized internal user preferably has access to user profiles belonging to one or more authorized external users and the customization database for the purpose of, for example, adding, deleting and modifying the Custom Records which are used to populate the display modules in the external users' portal web pages as will be described later. Preferably, at least one system administrator has access to all of the databases and can modify external user profiles and user Custom Records.

Figure 2:
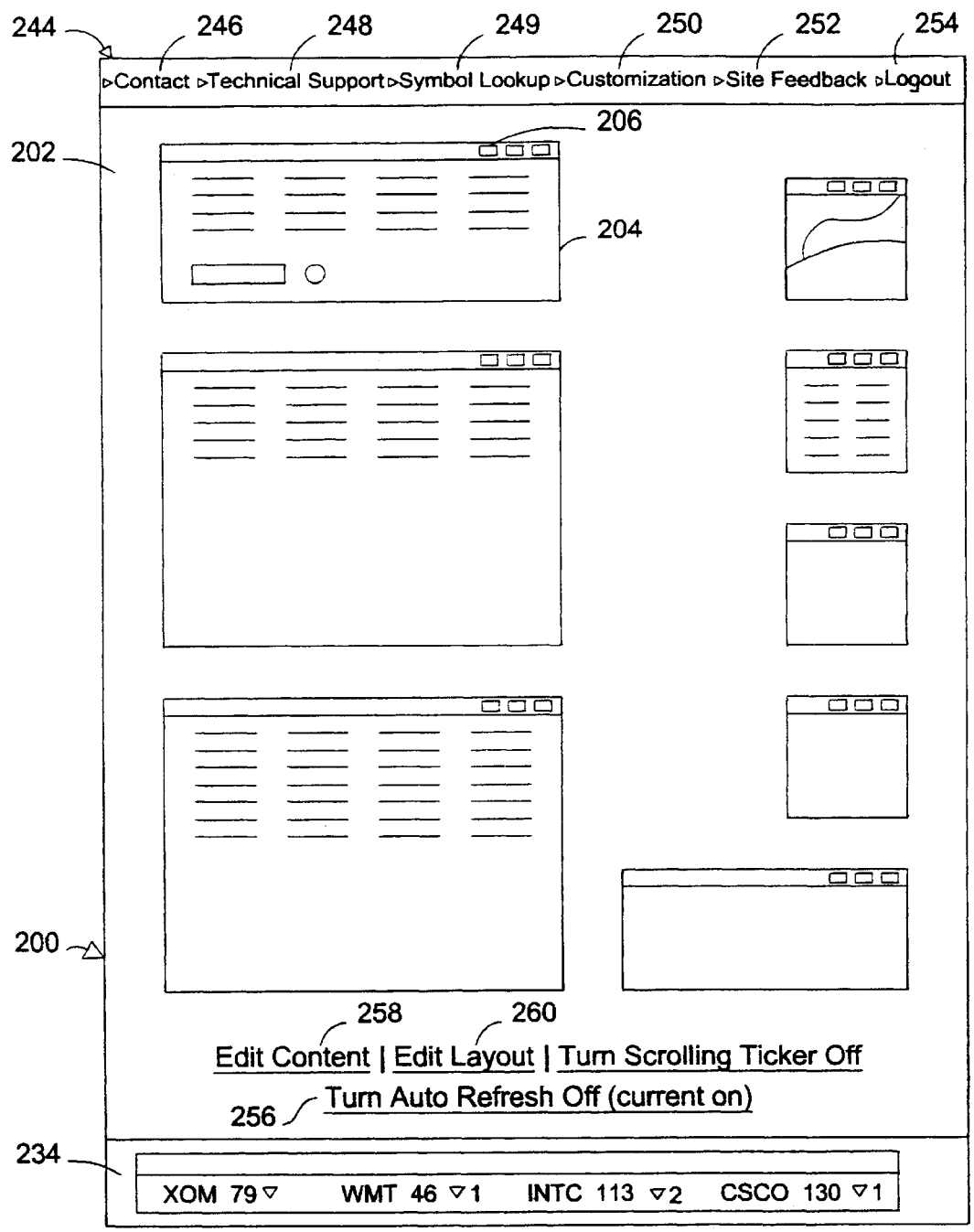
FIG. 2 shows a schematic of a portal web page according to the preferred embodiment of the instant invention.

A typical application of the instant invention will now be described with reference to FIG. 2. FIG. 2 shows a schematic diagram of a portal web page 200 according to an embodiment of the present invention. When an authorized external user accesses the web site hosted on processor 110 (FIG. 1), portal web page 200 is displayed. Preferably, such a web page displays financial information such as financial news, commentary, and data (collectively referred to as "content"). The content may be provided from such sources as public or proprietary databases and information services (105, FIG. 1). The content is displayed in the content area 202 of portal web page 200. The displayed content may be customizable, meaning that it may be customized (by creating Custom Records and retrieving information using the Custom Records as will be described later) by a user, or the content may be such that it cannot be altered by an end user.

The content is displayed in separate display modules (e.g. 204) which are contained in portal web page 200. Each one of the display modules preferably includes function buttons (e.g. 206). Each function button is associated with a respective feature of the present invention. For example, some or all of the modules may include a function button that, when clicked by a user, displays the content in the module in a graphical format. The features associated with the function buttons will be described below later in greater detail.

Each one of the display modules functions independently of the others so that modification of the content in one module will not change the content in the others. Preferably, the users can select which display modules will be included in the portal web page 200 according to an aspect of the present invention as will be described later. Preferably, end users may be restricted from including some of the display modules in portal web page 200 according to another aspect of the present invention as will be described later. The content that is displayed in each module may be pre-selected by the authorized user (external or internal) through the customization feature of the instant invention, which involves creation of unique Custom Records for each external user and storage of the same in the customization database (115, FIG. 1) such that each set may be accessible when a user logs onto the system 100. Each Custom Record can be used to populate a display module with content. In the instant invention, customization is provided on a shared basis between the external users and the internal users so that the internal users, such as analysts and financial advisors in an investment bank, may create, delete or modify the Custom Records for each external user. Customization on a shared basis, therefore, allows, for example, an investment bank to not only provide financial information to its client, but to pre-select and provide to each client a customized set of data. For example, a financial analyst at the investment bank can create a selection of stocks for his client to view.

Preferably, unless restricted, a user may include all or some of the following display modules in his/her portal web page: Equity Watchlist module 208 (FIG. 2*a*) which displays data on a selected group of stocks from a user customized list; Bond Watchlist 210 (FIG. 2*b*) module which displays data on a selected group of bonds; Market Watch module 214 (FIG. 2*d*) which displays stock and market indices according to a user's customization; News module 216 (FIG. 2*c*) which displays news from one or more information sources according to a pre-customized user search criteria; FX Rates module 218 (FIG. 2*e*) that displays a pre-selected group of currencies and data relating thereto; and Useful Links module 220 (FIG. 2*f*) which displays a list of preselected hyper-text links to other web sites; Market Commentary module 222 (FIG. 2*g*) from which streaming video and/or audio of commentary by market experts may be accessed; LIBOR & Treasury module 224 (FIG. 2*j*) which displays a graph of treasury yield curve interest rate benchmarks; Intraday Price module 226 (FIG. 2*i*) which tracks and displays the intraday price and volume movement of a stock in a graphical format; Team Advice module 228 (FIG. 2*h*) which displays a message from an internal user to the external user; Financial Glossary module 230 (FIG. 2*p*) for allowing the users to lookup definitions of financial terms; Global Investor News Flash (GIS News Flash) 232 (FIG. 2*q*) module for providing country-by-country updates on local trading, taxation and investment regulation; Scrolling Ticker module (234, FIG. 2) that displays ticker symbols for stocks and their respective price and volume of trade in the market. Commercial Paper Statement module 223 which displays information about short term corporate debt programs; Money Market Fund Watchlist 225 which displays information about various money market products; Equity Research module 227 which enables the users to conduct searches for news and other items on various stocks; and Fixed Income, Economic and Other Research module 229 which enables the user to conduct searches for financial news and other items.

Each one of these modules may include a Customization button (e.g. 1008, FIG. 2*a*), clicking on which allows the user to access the customization function for that module. Each one of the modules may also include a Detail button (e.g. 1010, FIG. 2*a*) and/or a Comparative Chart button (e.g. 1012, FIG. 2*a*) the function for each of which will be described later in detail. Each module also includes a Help button, designated with the symbol?, clicking of which will provide the user with on-line help with that module or other aspects of the system.

The portal web page (200, FIG. 2) also includes a navigation area 244 including the following functions: Contact 246 by which external users can send messages to selected internal users; Contact Technical Support 248 by which external users can send messages to internal users regarding technical matters; Symbol lookup 249 which allows the user to look up a symbol for a company; Customization 250 by which the users can access the customization features of the present invention; Site Feedback 252 by which external users can send messages to the administrator of the web site; and Logout 254 that allows the external user to log out of the system. Preferably, portal web page 200 refreshes automatically every ten minutes to provide the user with the most up-to-date information. The automatic refreshing feature may be turned OFF by clicking on the Turn Auto Refresh OFF button 256. The status of the automatic refresh feature is shown in parenthesis next to the Turn Auto refresh OFF button as shown in FIG. 2.

Portal web page 200 also includes an Edit Content button 258 which allows the user to select which display modules will be included in his/her portal web page (200, FIG. 2); an Edit Layout button 260 clicking on which allows the user to access a feature in the present invention for positioning of the selected modules on portal web page; and a Turn Scrolling Ticker OFF button clicking of which turns scrolling ticker 234 off.

When Contact 246 is selected by a user, the user is presented with a window 200 as shown in FIG. 3. This Window 300 contains a subject text box 305, a message text box 310, a listing of internal users 315 and a selection box 320 associated with each of the listed internal users. Using window 300, the user is able to select and contact one, or a plurality of the internal users from the list 315. The internal users in list 315 are authorized internal users. When an internal user is selected, information relating to that internal user is displayed in a box 330. Such information may include the internal user's: telephone number; fax number; home number; fax number at home; work address; home address; and e-mail address. When Send button 335 is clicked, an e-mail message is composed and sent to the selected internal users. This feature allows communication between the external user and authorized internal users without requiring the user to go outside of portal web page (200, FIG. 2) to, for example, an e-mail service. A clear button allows the user to type new information in the subject text box 305 and message box 310 by clearing these boxes of existing text, and preferably resets the user's selection of the internal users. Technical Support function (248, FIG. 2) and Site Feedback function (252, FIG. 2) provide for a way of communication similar to Contact function (246, FIG. 2) in all essential aspects and thus will not be discussed here in detail.

When Symbol Look up (249, FIG. 2) is clicked the user is provided with a search screen 400 as shown in FIG. 4. Search Screen 400 includes an Issues drop down menu 402 which allows the user to select any type of issue such as equities, mutual funds, indices, etc. An Exchange drop-down menu 404 allows the user to select the exchange and the currency drop-down menu allows the user to select the currency. Search Screen 400 also includes a keyword Search Box 408. The user may enter a search keyword in Keyword Search Box 408 and click the GO button to conduct a search. Search Screen 400 includes also a Search Result area 410 for displaying the results of the search.

Figure 2A:
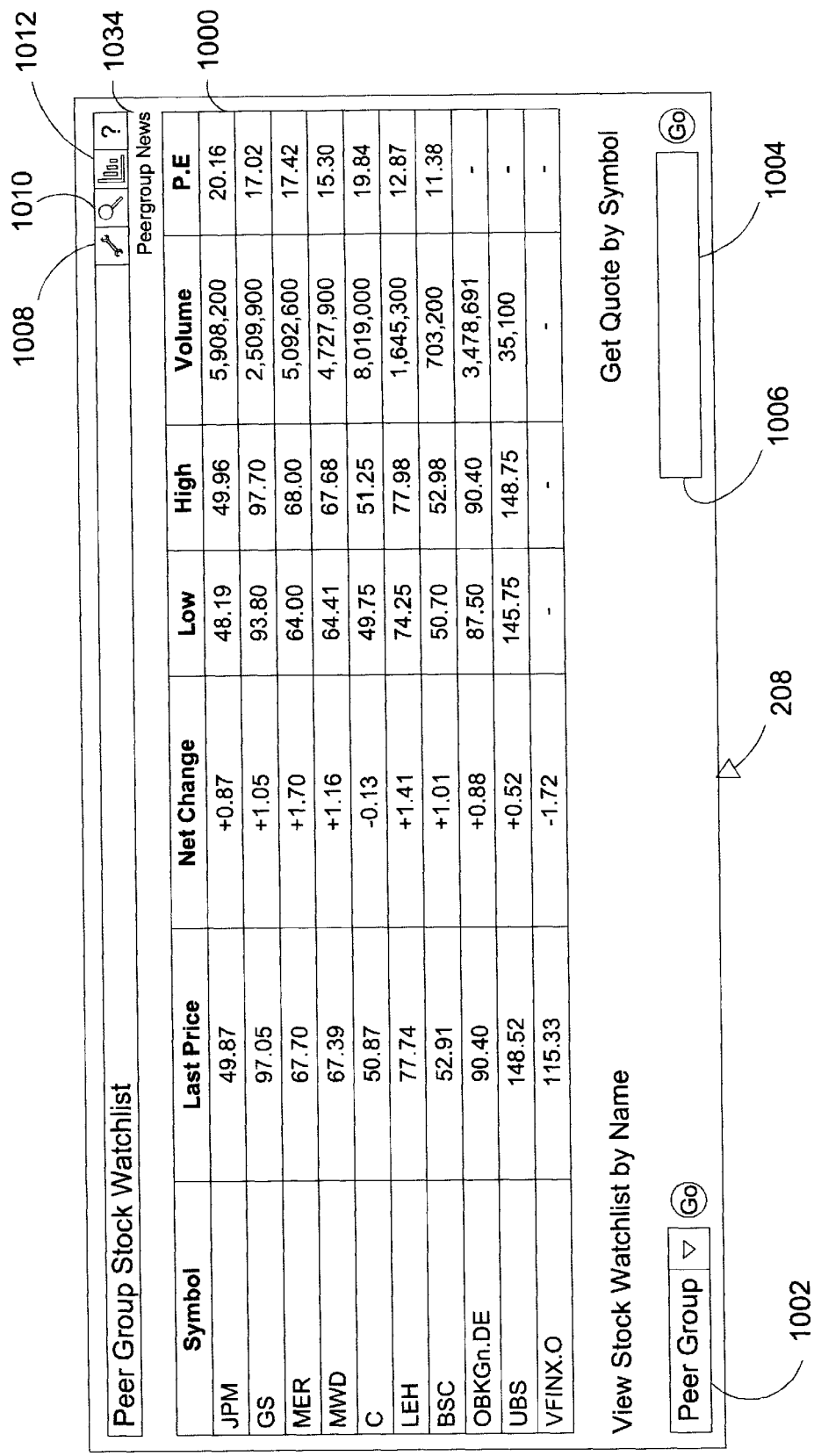
FIGS. 2a–2n and 2p–2q show embodiments of independently functioning and independently selectable information display modules.
Figure 2A:
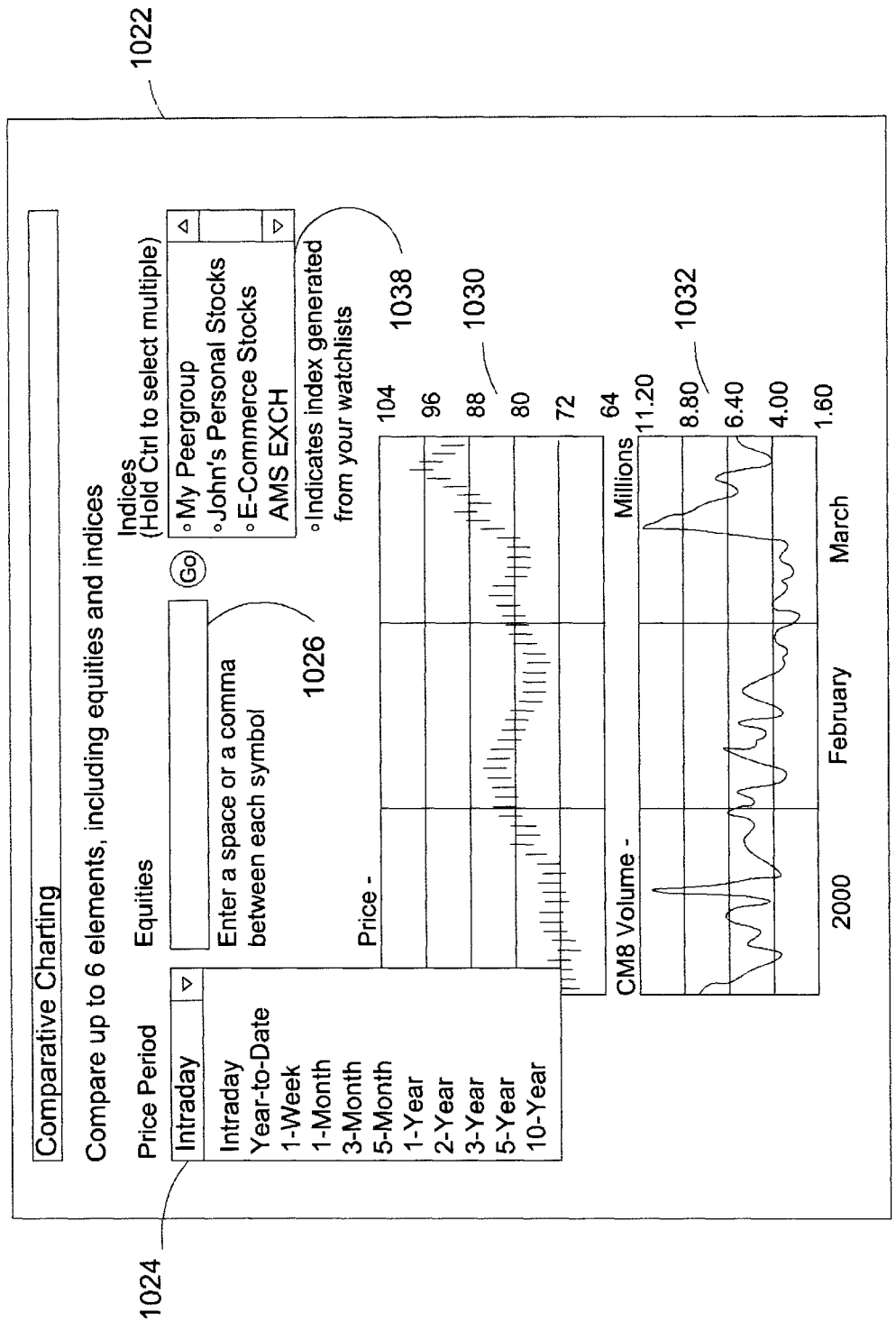

Referring now to FIG. 2*a*, Equity Watchlist 208 will now be described. Equity Watchlist 208 includes a table 1000 in which a group of stocks, equities, and their related data are displayed. The data displayed in this table is obtained from one or more data sources according to a Custom Record referred to herein as an equity watchlist. One or more equity watchlists can be stored in the customization database (130, FIG. 1) each under a unique watchlist name. A list of watchlist names is available from the View Stock Watchlist drop-down menu 1002. Once the View Stock Watchlist drop-down menu 1002 is opened, the user may highlight a name and click on Go. Then, the table is populated with data obtained according to the Custom Record associated with the watchlist selected by the user. Preferably, the data in table 1000 includes a ticker symbol, the last price, the net change, the day's range (low, high), the volume traded, and the market cap for each stock in the watchlist.

FIG. 2*a* shows an example of a Watchlist called a Peergroup Watchlist. A Peergroup Watchlist displays to the user the particulars of the stocks for the user's company's competitors. The Peergroup Watchlist may also include the user's company so that, when Peergroup Watchlist is displayed the user may make a comparison between his company and its competitors quickly.

In this embodiment, new watchlists may be added, and existing watchlists may be edited or deleted through customization on a shared basis. The customization feature for this module is activated by an authorized user (internal or external) by clicking the Customization button 1008 on the module, or the Customization option (205, FIG. 2) in the navigation area (244, FIG. 2) of portal web page (200, FIG. 2). The customization feature for each module will be described later with more detail.

Equity Watchlist module 208 includes a Detail button 1010 and a Comparative Chart button 1012. By clicking on Detail button 1110, a new window 1014 is displayed to the user as shown in FIG. 2*aa*. Window 1014 includes a View Stock Watchlist drop-down menu 213 from which any of a number of previously compiled watchlists may be selected, and a Select View drop-down menu 1018 from which specific values for each listed stock may be selected. When the symbol for a stock in this table is clicked, a detailed quote for that stock is displayed. A window displaying a detailed quote is shown in FIG. 2*aaa* as an example. Window shown in FIG. 2*aaa*, which displays details of a particular stock, may also be obtained by using the Get Quote by Symbol function (1004, FIG. 2*a*).

A comparative chart of selected stocks may be made when the Make Graph button 1018 in FIG. 2*aa* is clicked. To make a selection for comparative charting, a user may place a check mark in a selection box (e.g. 1020) associated with the stock. When the Make Graph button 1018 is clicked, a one year price period is set as a default value to construct a comparative chart for the selected stocks.

By selecting the Comparative Chart button (1012, FIG. 2*a*), a user can construct a comparative chart of stock prices along with market indices and/or watchlist indices. When Comparative Chart button 1012 is clicked, a comparative charting window 1022 is presented to the user as shown in FIG. 2*ab*. This window includes a price period drop-down menu, from which a price period is selected. The user can enter the symbols for the equities in Equities entry box 1026, and/or select indices from the Indices List 1028 for comparison. As shown, Indices List 1028 includes market indices as well as indices for various watchlists. The graphs 1030, 1032 show price and volume movements, respectively, for a selected stock for a 3 month price period.

Referring back to FIG. 2*a*, Equity Watchlist Module includes a Peergroup News Link 1034, which when clicked displays a search screen 1036 to search news items on the companies in the Peergroup Watchlist as shown in FIG. 2*ac*. Search Screen 1036 includes a search term entry box 1038 in which the user may enter search terms and a News Source drop-down menu 1040 which provides a list of news sources to the user for selection. A search of the selected news source is conducted by clicking on Go button, and the search results are preferably displayed in the Search Results area 1042. Each item in the Search Results area is preferably a hyperlink to the file containing the text of the news item. Under each hyperlink there is preferably provided a summary of the content of the news item that has been found through the search. The user may view the news item by clicking on the hyperlink that is associated with the news item.

Figure 2B:

Referring to FIG. 2*b*, bond information from on-line information sources may be displayed in a bond Watchlist module 210. The Bond Watchlist module includes a table 1044 for displaying bonds and their related information, such as issuer name, coupon, maturity, etc.; a customization button 1046; a detail icon 1048; a Get Bond by Issuer Name entry box 1050 for retrieving specific bond information, and an Advanced Search link 1052.

In this embodiment, information for up to ten bonds may be displayed in the main page. These bonds are ordered from the earliest to the latest maturity date, and then alphabetically by the issuer name.

By clicking on customization button 1046, the user is provided with various windows for customizing the content that will be displayed in the Bond Watchlist module as will be described later. By clicking on the Detail button 1048, detailed bond information will be displayed in a Bond Detail window (not shown). This module may include: a Bond Detail Table that includes bond issues and a respective check box for each of the issues; a Make Graph button; a Watch Bond button; a Next Page button; a Previous Page button and a page number indicator showing the page being viewed and the total number of the pages. When the Bond Detail is clicked, a bond result set for the user's selected bond issue is displayed in a new window.

The Make Graph function allows the user to construct a graph of information related to a selected group of bond issues. To use the Make Graph function, the user must select the bonds by placing a check mark in its respective check box and click on the Make Graph button. If the user clicks on the Watch Bond button, all the selected bonds will be added to the Bond Watchlist. If the user clicks on a bond issue, the bond will be passed to the Bond Issue Detail module, which will display descriptive and analytical bond data for the selected bond issue.

In the detail mode, i.e., when the user has clicked on the Detail button 1048, a maximum of five hundred bond issues may be displayed, which is divided into ten (10) pages, each including fifty (50) bond issues. When the user clicks on the Next Page button to view the next page of the search results in this mode, the bonds will be sorted and displayed alphabetically in ascending order, then by maturity date for bonds from the same issuer name. A separate frame appears on the top of the next page display results to keep track of the selections made by the user. Similar results are obtained when the Previous Page button is clicked. In another embodiment, the Bond Watchlist Module 210 may be provided with an option for selecting a Bond Watchlist from a plurality of Watchlists.

The Advanced Search hyperlink 1052, when clicked, provides the user with the Bond Advanced Search Window 1054 of the instant invention as shown in FIG. 2*ba*. This feature provides users with several search options that can be used to search for bonds that meet certain criteria. This feature includes an Advanced Search module which has the following elements: Issuer Name text box 1056 in which the name or a symbol from the bond issuer is entered by the user; Maturity Range boxes 1058*a* 1058*b* in which maturity range may be entered in the user; Moody Ratings Range drop-down boxes 1060*a*, 1060*b*; S&P Ratings Range drop-down boxes 1062*a*, 1062*b*; Country option box 1064; Currency option box 1066; Coupon Range boxes 1068*a*, 1068*b*; and an Industry option box 1070. When no range is entered by a user, the default value for all the search fields that require a range is all or the maximum range indicated for each such field. The Coupon Range for example is a range of positive integers between 0 and 20, and the Maturity Range is a range of positive integers selected from 0 to 99. A search is conducted when the Go button is clicked. The results of the search are displayed in one or several windows (not shown). The maximum number of windows displayed as a result of an Advanced Search is ten (10). A maximum of fifty (50) bonds can be shown in each window.

The News module 216 displays a list of hypertext links to news items that are obtained by searching various information sources (105, FIG. 1) based on a user customized search criteria which is stored as a Custom Record. The news items are accessible via hyperlinks (e.g. 1074) which are provided in the news items area 1072. When a hyperlink is clicked, the news item is displayed in a window (not shown). Preferably, the hyperlink recites the topic of each news item, under which preferably the source of the news item, its date and time are displayed as shown. Preferably, a list of only five links are displayed in the news items area 1072. An extended list of news items can be obtained by clicking on the Detail button 1076.

The search criteria for the News module 216 is customizable by the users (internal and external) on a shared basis. The search criteria is stored in the customization database (115, FIG. 1), and used to search for news items each time the user logs onto the system. The Customization function for the News module 216 is accessible by clicking on the Customization button 1078. Using the customization function a search criteria may be devised and stored as a Custom Record which is then used as a default search criteria when the user logs on.

By clicking on the Advanced Search feature 1080, the user is provided with a window (not shown) which includes preferably a number of entry boxes in which the user can enter various search parameters such as a keyword, data ranges and selected information sources. The user can then submit these parameters as a search criteria, and receive up to one hundred items as a search result. This feature allows the users to devise a search criteria to search various information services while logged on without changing the default search criteria, i.e. the Custom Record associated with the module.

Figures 2C, 2D:
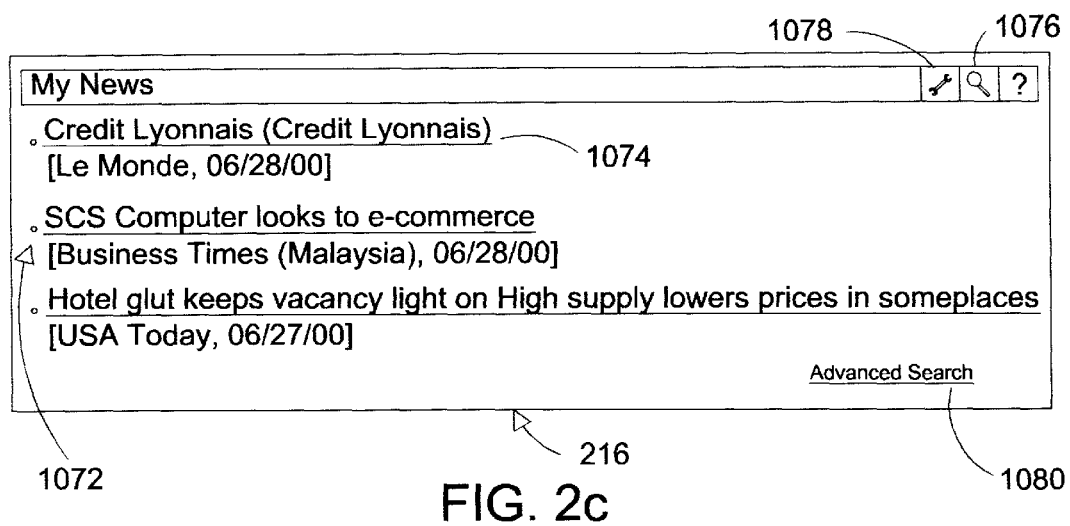

FIG. 2d shows Market Watch module 214 which displays four market indices, their last traded level and change for the day in a table format. These indices are pre-selected by the users (internal and external) on a shared basis through customization, and stored in the customization database (115, FIG. 1). The system uses these selections to construct table 1082 in the module 214. The customization function is accessed by clicking on the Customization button 1084.

By clicking on the Detail button 1086 of this module, a list of quotes for the indices is provided to the user. Each quote preferably includes last traded level for the index, its net change, its net percentage change, and a time and date for the quoted information. When the comparative chart button 1088 of this module is clicked a graphical representation of the comparison of the information is provided in table 1082.

FIG. 23 shows FX Rates module 218 which displays currency cross rates in a cross rate table 1090 for a preselected group of foreign currencies. Preferably, cross rates for four currencies are displayed. The currencies may be pre-selected through customization by the users (internal and external) on a shared basis, stored in the customization database (115, FIG. 1) and used to construct the cross rates table each time the external user logs onto the system. The customization feature for this module may be accessed by clicking the Customization button 1092 on the module.

When Detail button 1094 of this module is clicked, the external user is provided with: spot rates for all or a pre-selected group of currencies, for example for all of the currencies in Europe or Africa; cross rates for a pre-set group of major currencies, for example, English Pound to Japanese Yen; LIBOR fixings for a pre-set group of currencies; and charts for each of the foregoing. Preferably, all of the spot rates and the cross rates are reported in a table in another window (not shown) wherein the ask price, the bid price, the high, the low and the time and date for each spot rate or cross rate will be provided. The LIBOR fixings of future spot rates for a select group of currencies over various periods are preferably provided in a table (not shown) wherein the table includes: the currency, the reported period, the last date, the year high, the year high date, the year low and the year low date. A historical chart of spot rates (not shown) is constructed for any selected pair of currencies for a selected period of time using the comparative charting function. The comparative charting function may be accessed by clicking on the comparative chart button 1096. The user can make the selection of a pair of currencies and the period for constructing such a historical chart.

Spot rate for a currency may be obtained by clicking on the Spot Rates hyperlink 1098. Cross rates for particular currencies may be obtained by clicking on the Cross Rates hyperlink 1100. Using Spot Rates hyperlink 1098 and Cross Rates hyperlink 1100, the user can obtain spot rates and cross rate without having to change the default setting that has been preselected through customization.

FIG. 2f shows Useful Links module 220 which displays hypertext links to pre-selected web sites. These web sites may be preselected by the users (internal and external) on a shared basis through customization as will be described later. The customization feature of this module can be accessed by clicking on customization button 1112. The list of link in the module may be expanded by clicking on Detail button 1114.

FIG. 2g shows Market Commentary module 222 which displays links (e.g. 1116) to commentaries by market analysts. A commentary is provided in streaming audio format when the link is clicked. For example, Morning Call 223 is an economic analysis that is provided on a daily basis in an audio format. Preferably, a summary, including the name of the analyst and the date and the time for each commentary is provided next to the link as shown. The list of links for available commentaries may be expanded by clicking on the Detail button.

Figure 2I:
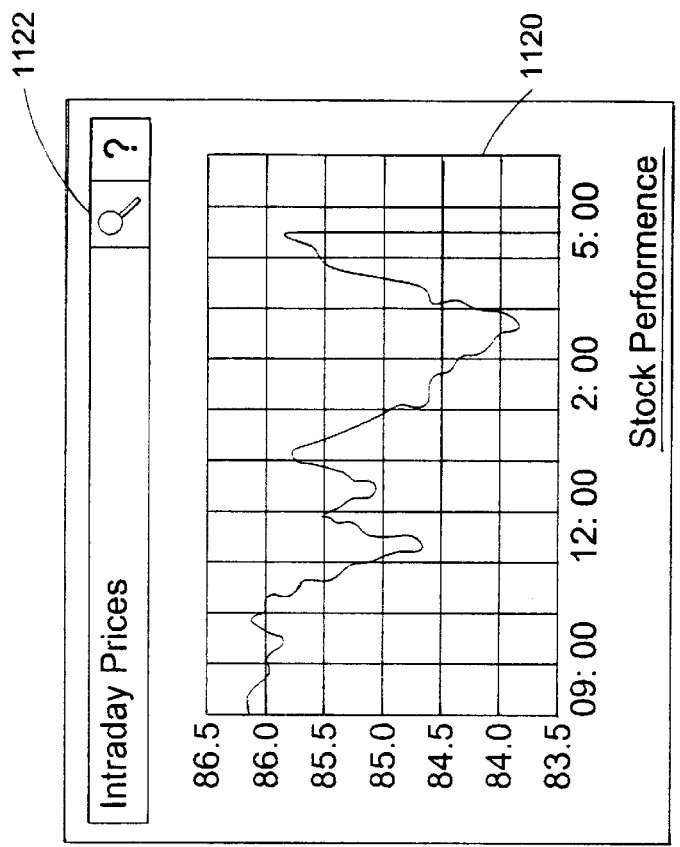
Figure 2H:
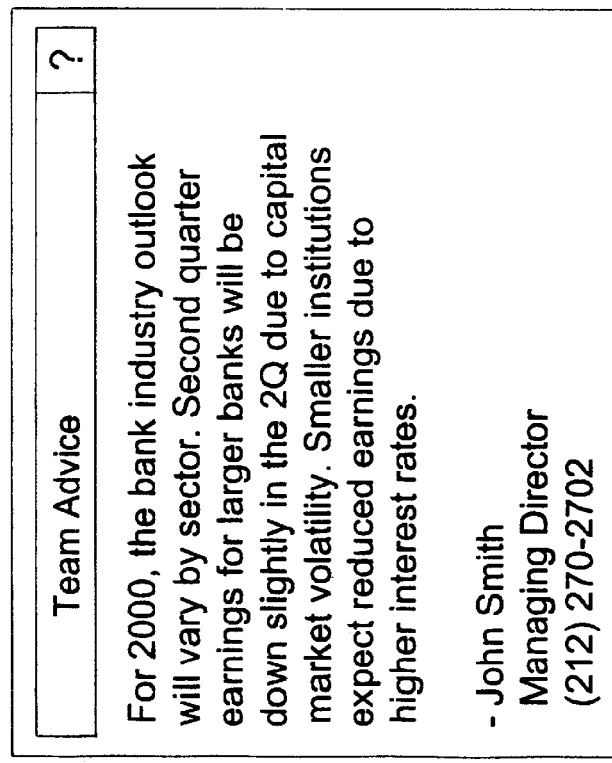

FIG. 2h shows Team Advice module 260 which displays a message from an internal user to the external user, and thus provides a venue for an internal user to communicate with all or a selected group of external users on any subject. This message is automatically removed from the external user's portal web page on an expiration date that is provided by the authorized internal user. This aspect of the Team Advice module will be described in more detail later.

FIG. 2i shows Intraday Prices module 226 which displays the industry trends and the volume of trades of the external user's company's stock in a graphical format. The user can construct a comparative chart using the comparative chart feature of the present invention either by clicking on the graphical display 1120 or on the Detail button 1122. To make a comparison, any accessible stock may be selected by the user.

Figure 2J:
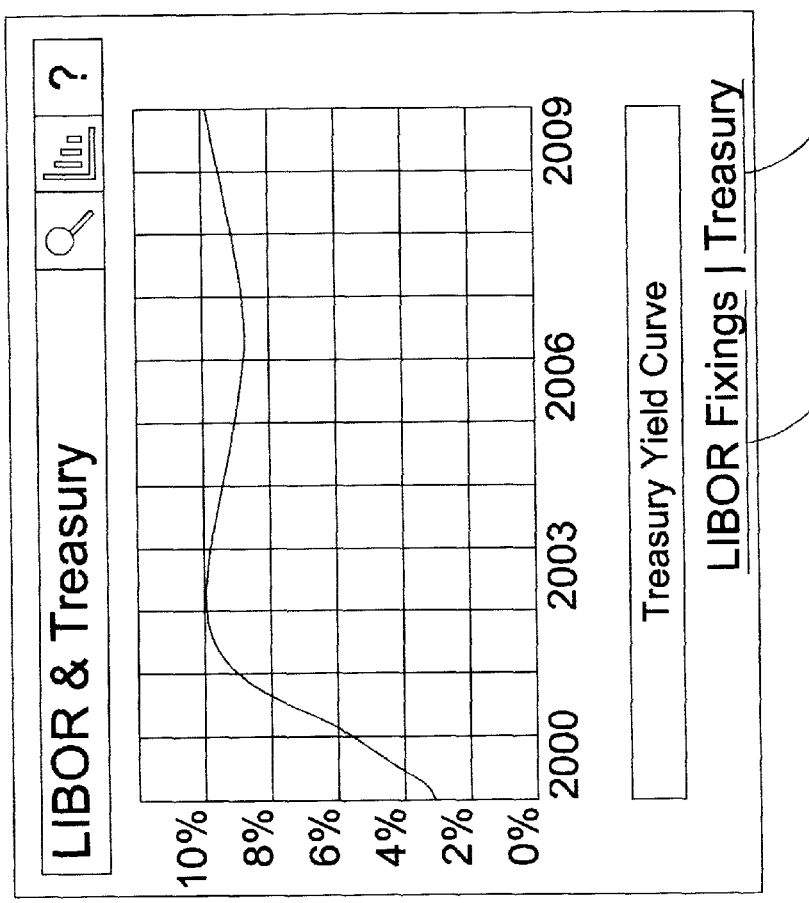
Figure 2I:
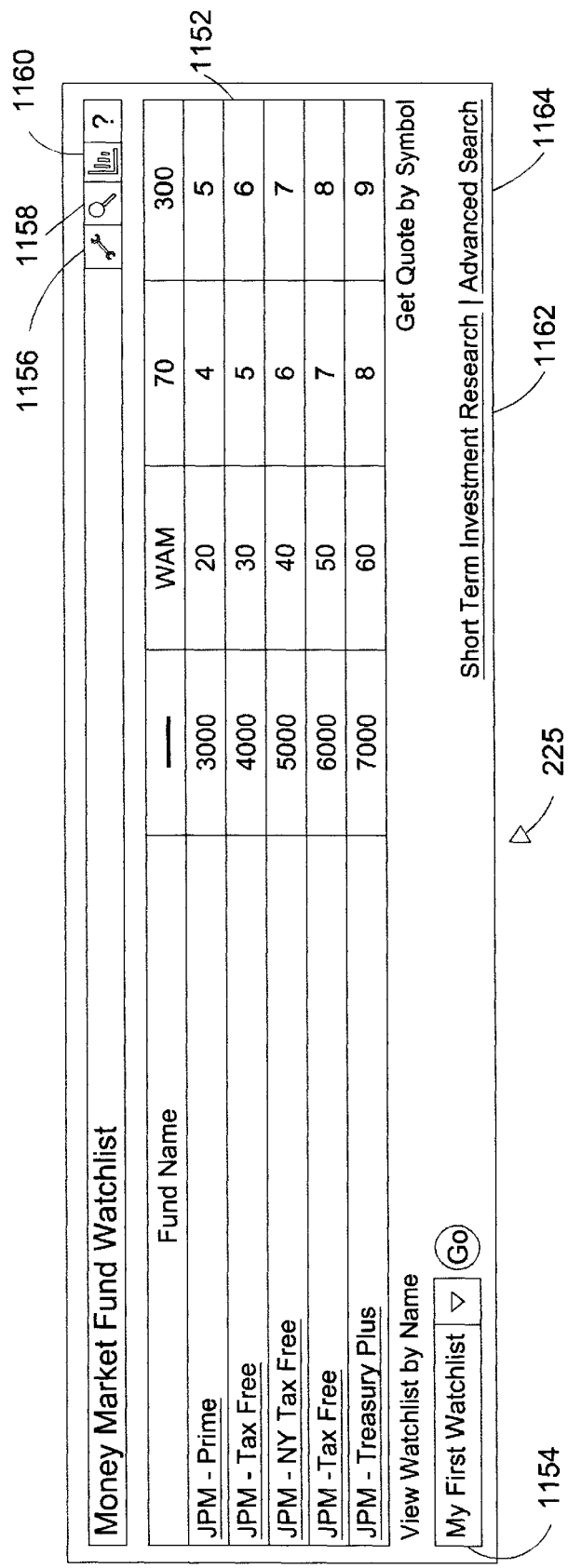

FIG. 2j shows LIBOR & Treasury module 224 which displays a graphical display of a treasury yield curve. This module can show treasury yields over various periods. The user can also view Libor rates for selected currencies and Treasury Yields and their related charts by using this module.

When the Libor Fixings hyperlink 1124 is clicked by the user, a window showing a table 1126 that contains Libors for selected currencies and their related information is provided to the user as shown in FIG. 2ja. A chart can be constructed from this information and displayed to the user by clicking on the chart button 1128. An example of a chart so constructed is shown in FIG. 2jaa.

When the Treasury hyperlink 1130 is clicked, a window showing a table 1132 that contains various United States Treasuries and their related information is displayed to the user as shown in FIG. 2*jb*. A chart can be constructed from this information and displayed to the user by clicking on the chart button 1134. An example of a chart so constructed is shown in FIG. 2*jba*.

FIG. 2*k* shows Commercial Paper Statement 223 module which displays information about short term corporate debt programs in a display area 1136. The user may select a program using Program Name drop down menu 1138 and click on Go to view the particulars of the selected program in display area 1136. Customization button 1140 may be used to create a Custom Record on a shared basis, which is used to retrieve the information that is displayed in display area 1136 whenever the user logs on. The amount of detail provided in the display area 1136 may be expanded by clicking on detail button 1142. User may also obtain information about the Distribution by maturity, geography or account type by clicking on the respective hyperlinks 1144, 1146, 1148. Advanced search hyperlink 1150 may be clicked to access a search feature (not shown) for searching for particular types of programs according to user defined criteria while logged on without have to vary the default setting; i.e. the Custom Record associate with the module.

FIG. 2*l* shows Money Market Fund Watchlist module 225 which displays information about various money market products in a table 1152. Similar to Equity Watchlist (208, FIG. 2*a*) this module includes a view Watchlist by Name drop-down menu 1154 which allows the user to select a created and stored watchlist from a list and click on GO to have the watchlist used to retrieve the information that is to be displayed in table 1152. The watchlist that may be selected from view Watchlist by Name drop down menu 1154 can be created by the users (internal and external) on a shared basis. The customization feature may be accessed by clicking on customization button 1156. The information in table 1152 may be expanded to show more detail by clicking Detail button 1158. A comparative chart of selected money market funds may be constructed and displayed using the comparative chart function (not shown) of the module. The comparative chart function may be accessed by clicking comparative chart button 1160.

Money Market Fund Watchlist module 225 also includes a Short Term Investment Research function which may be accessed by clicking on Short Term Investment Research hyperlink 1162. Advanced search hyperlink 1162 provides the user with an Advanced search feature (not shown) which enables the user to obtain information on Money Market Funds according to a user defined criteria without having to vary the default settings.

Figure 2M:
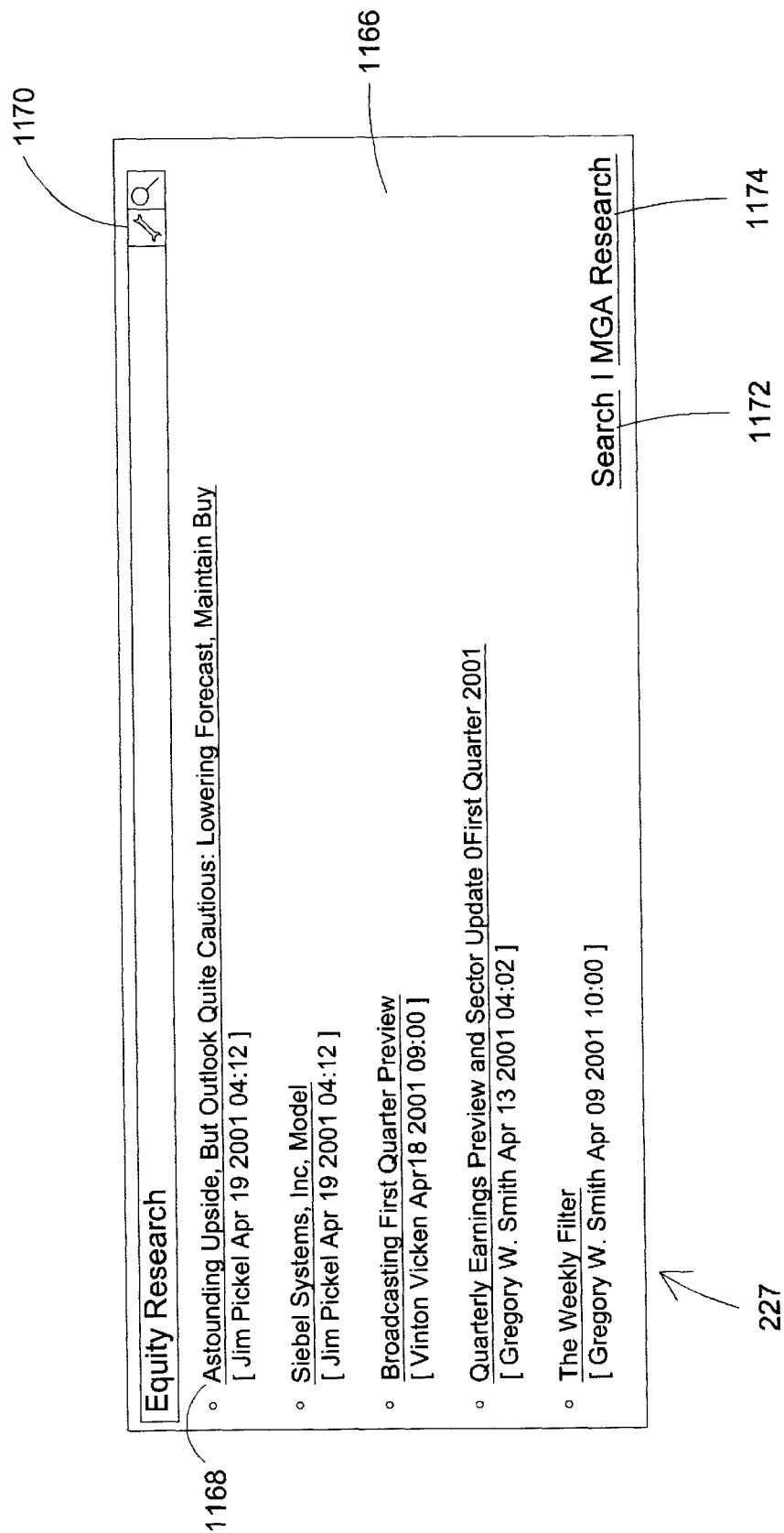

FIG. 2*m* shows Equity Research module 227 which displays hyperlinks to news, commentary and other items on the equities market in display area 1166. The user may click on any of the hyperlinks (e.g. 1168) to view the full text of the document associated with the hyperlink. Preferably, the author of the document is listed with the hyperlink to the document. A Custom Record may be created through the customization feature on a shared basis between an internal and an external user. The Custom Record so created is used to search and retrieve the items that are to be displayed in display area 1166. Customization feature for this module may be accessed by clicking on Customization button 1170. The list of hyperlinks and information provided with each hyperlink may be expanded by clicking on Detail button 1172.

Equity Research module 227 preferably includes a search function (not shown) which may be accessed by clicking on search hyperlink 1172. Using the search function a user may be able to search for items on the topic of equities without having to change the Custom Record. Preferably, an M&A Research function (not shown) can be accessed by clicking on M&A Research hyperlink 1174. The M&A Research function can be used by a user to conduct research on the topic of mergers and acquisitions.

Figure 2N:
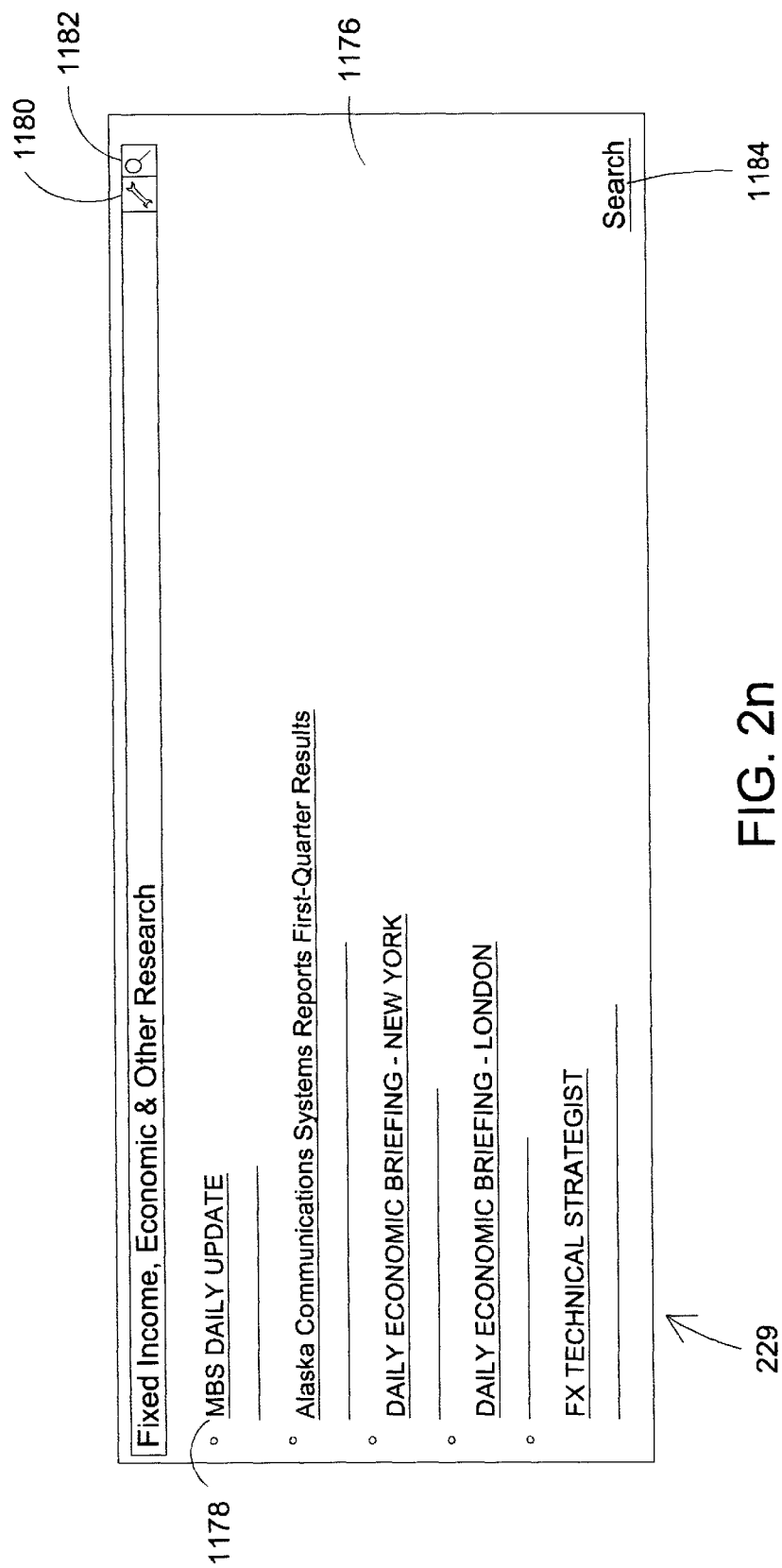

FIG. 2*n* shows Fixed Income, Economic and Other Research module 229 which displays links to various documents in a display area 1176. Each hyperlink (e.g. 1178) can be clicked to access the document. Preferably, the name of the author of the document is provided with each respective link.

The hyperlinks in display area 1176 are retrieved using a custom record which can be created and modified on a shared basis between an internal and an external user using the customization feature of this module. The customization feature of this module can be accessed by clicking on customization button 1180. The list of items in display area 1176 may be expanded by clicking on Detail button 1182. A search function (not shown) is preferably provided with this module. The search function may be accessed by clicking on Search hyperlink 1184. The search function allows the user to search for items according to a user defined criteria without having to change the Custom Record.

Figure 2P:
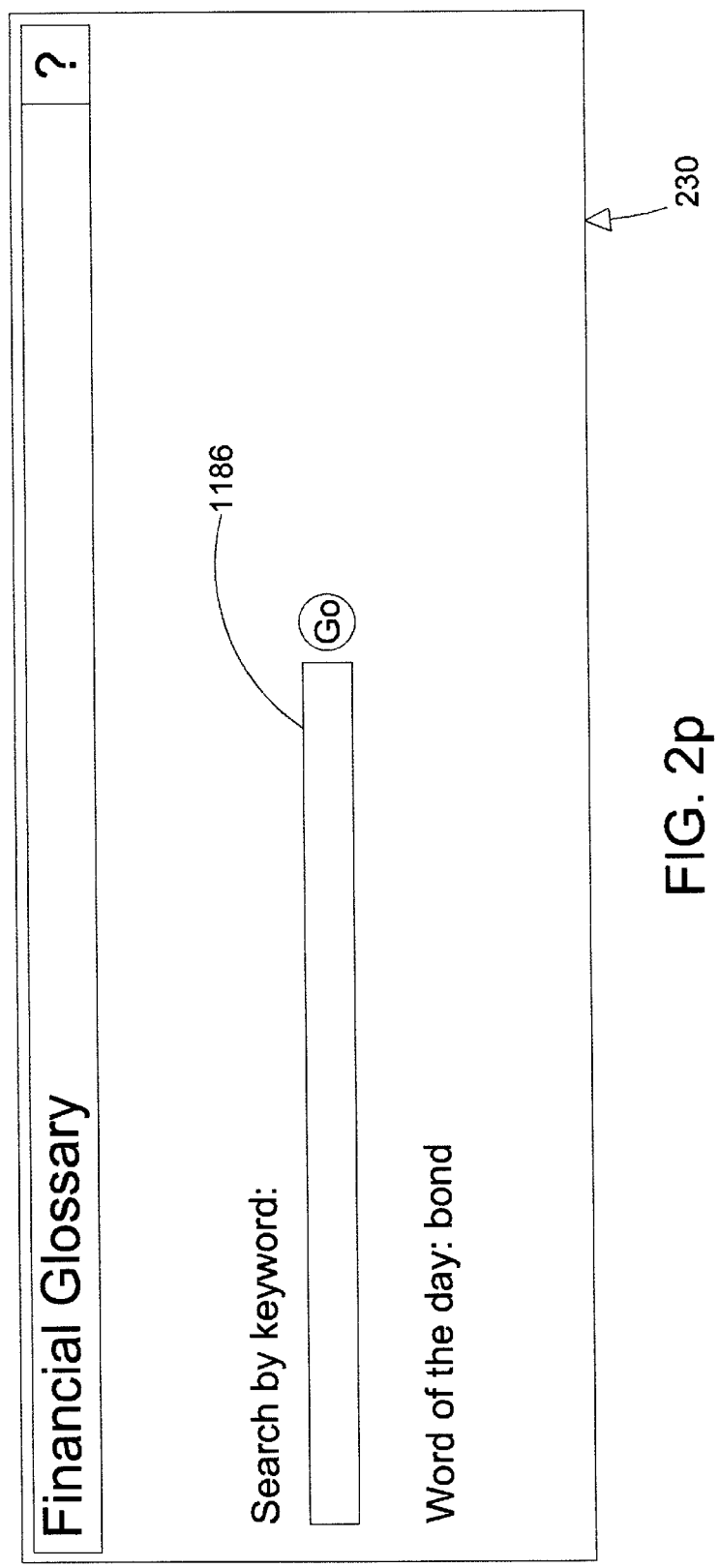

FIG. 2*p* shows Financial Glossary module 230 which allows the user to lookup definitions for various financial terms. This module includes a text box 1186 where the user may enter the search terms. The search terms may be all or part of a word. By clicking on the Go button a Glossary-Details window containing the definition of the search term will be displayed to the user as shown in FIG. 2*pa*. This window includes: a search term box 1190, which allows the user to search other terms; an area 1192 in which a list of financial terms appears in alphabetical order; and a definition area 1194 in which the search term and its definition are displayed. This window also includes a list of hyperlinks (e.g. 1196) allowing the user to browse through the glossary alphabetically.

Referring to FIG. 2*p*, the Financial Glossary module 230 also includes a hyperlink to the definition of a preselected financial term. This term may be selected on a daily basis to be displayed in the Financial Glossary module 230. By clicking on this link, the user is provided with the definition of the displayed term.

Figure 2Q:
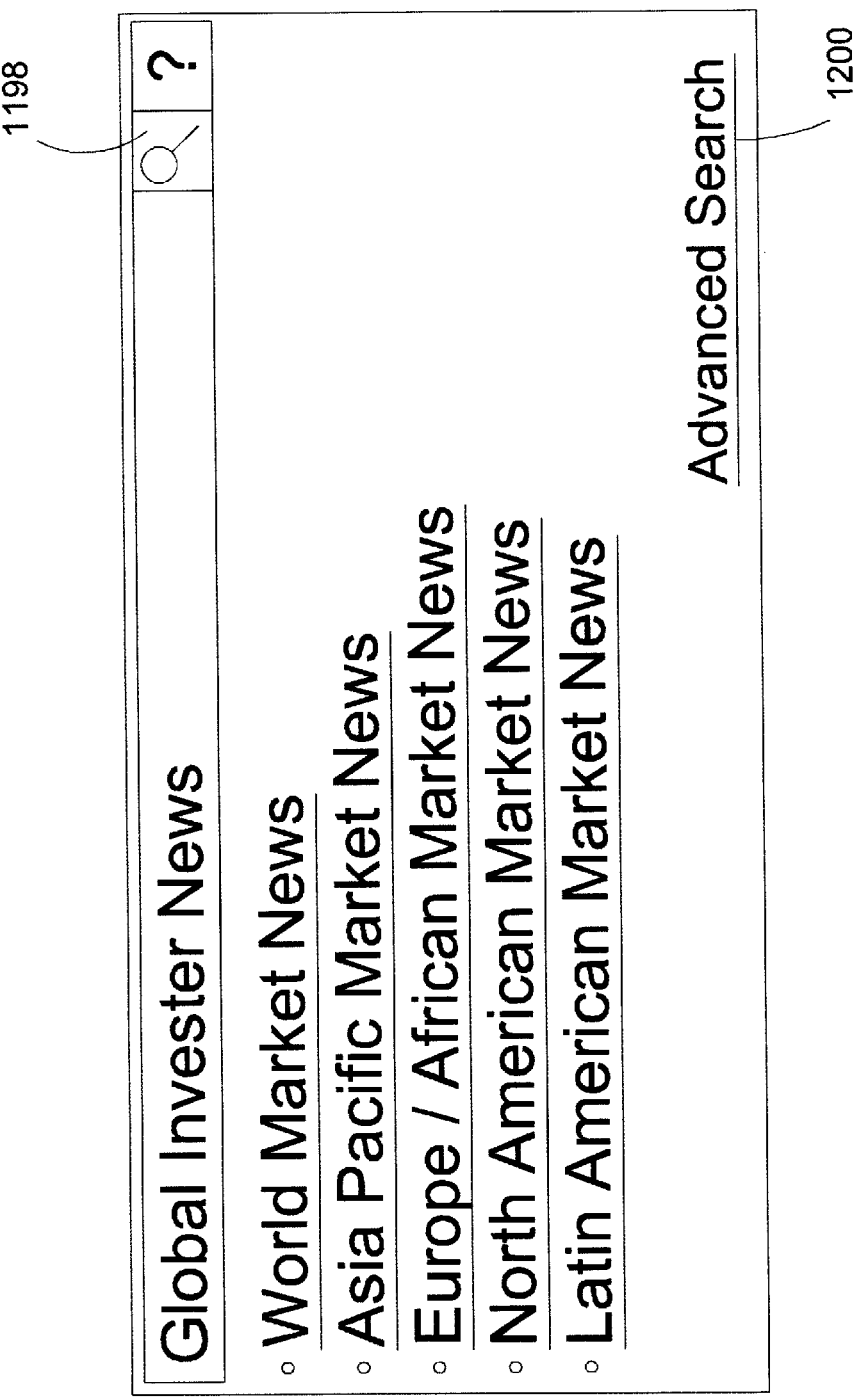

FIG. 2*q* shows GIS News Flash module 232 which includes links to news items on various geographic markets, a Detail button 1198, and an Advanced Search link 1200. When Advanced Search link 1200 is clicked, the user will be provided with an Advanced Search: Global Investor News window 1202 as shown in FIG. 2*qa*. This window includes a search result area 1204 for displaying the search results of an advanced search conducted according to the parameters provided by the user. These parameters include: the geographic market, which may be selected from a financial market list 1206; a new category which may be selected from a news category list 1208, and a period which may be selected from a select period drop-down menu 1210. A period may range between one month to two years.

The user can have the search results sorted by using the sort feature in the window by selecting either the market sort criteria 1212 or the date sort criteria 1214. The search parameters may then be submitted to the system by clicking on the submit button 1216. The result of the search will then be displayed in the search result area 1204. The search results shown in this area are hyperlinks which when clicked provide the user with the item in the PDF format. The results are preferably provided in multiple pages. Preferably, a next button 1218 is provided to advance the display to the next page. Preferably, also a Page button (e.g. 1220) are provided to advance the display area to a desired page.

Figure 5:
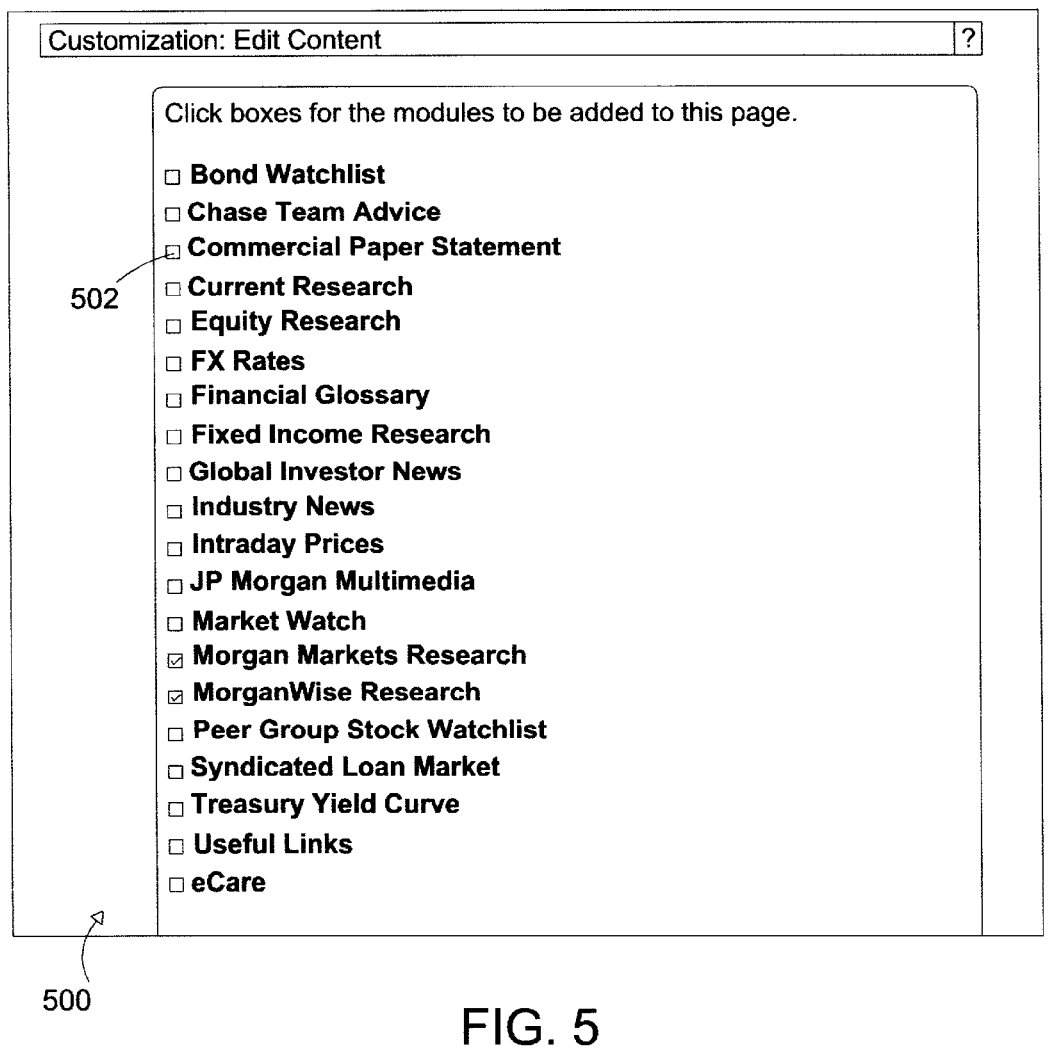
FIG. 5 shows a customization window according to an aspect of the invention.

As stated earlier, an external end user, i.e. an end user, may select any and all of the above-described modules to be displayed in his/her portal web page when he/she logs onto the website except for those modules which have been restricted to a particular user or a particular group of users as will be described later. A user may also designate the position of each selected module. A user may select which module will be selected by clicking on the Edit Content button 258. Once clicked, the user will be provided with Edit Content window 500 as shown in FIG. 5. Edit Content window 500 provides a list of display modules, each associated with a selection check box (e.g. 502). The user may select the modules that he/she wishes to have displayed in his/her portal web page when logged on by clicking on a respective check box for the desired module. Once the selections have been made the selected modules will appear in the user's portal web page every time the user logs on, until the selections are changed. It should be noted that the content of the portal web page may be customized by the users (internal and external) on a shared basis.

Figure 6:
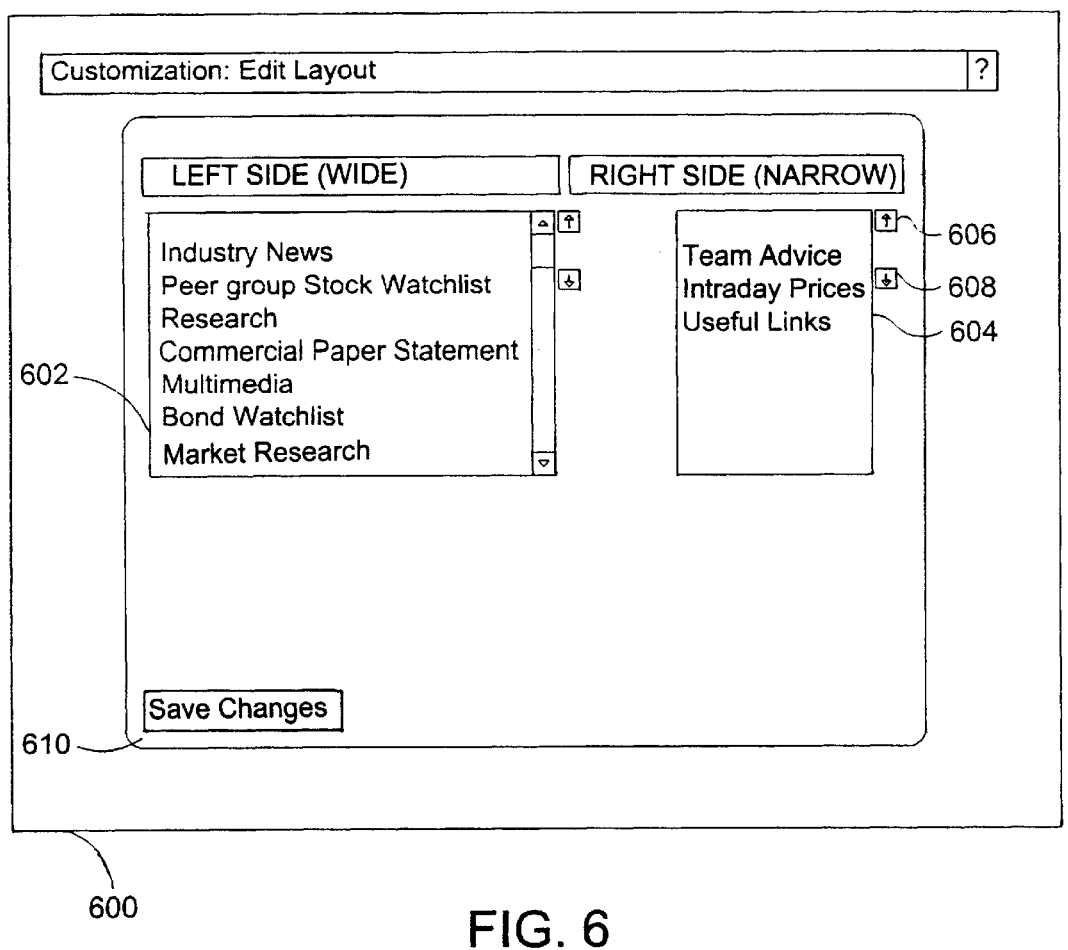
FIG. 6 shows a customization window according to an aspect of the invention.

The user may designate the position of each selected module by clicking on the Edit Layout button 260. Once clicked, a window 600 will be provided to the user as shown in FIG. 6. This window includes a Left Side position selection box 602 and a Right Side position selection box 604. Both selection boxes provide a list of the modules. The user may designate a module to appear on the left side of his/her portal web page by clicking on the module in Left Side position selection box 602. Similarly, the user may designate a module to appear on the right side of his/her portal web page by clicking on the module in Right Side position selection box 604. The user may scroll up/down through the listing of modules in each of the boxes by clicking on an up button (e.g. 606) or a down button (e.g. 608). Once the modules' positions have been designated, the user can save their position by clicking on the Save Changes button 610. It should be noted that the position of each module may be customized by the users (internal and external) on a shared basis.

As stated previously, the content for certain modules in the portal web page (200, FIG. 2) can be customized by authorized internal users and the authorized external users on a shared basis. For this purpose, the customization function for each module can be accessed by clicking on the Customization option (250, FIG. 2) provided on the navigation area (244 FIG. 2) of the web page or clicking on the Customization button of the respective module as previously described. When the Customization option is selected from the navigation area, the system recognizes whether the user is an authorized internal user or an authorized external user and displays a customization window accordingly.

Figure 7:
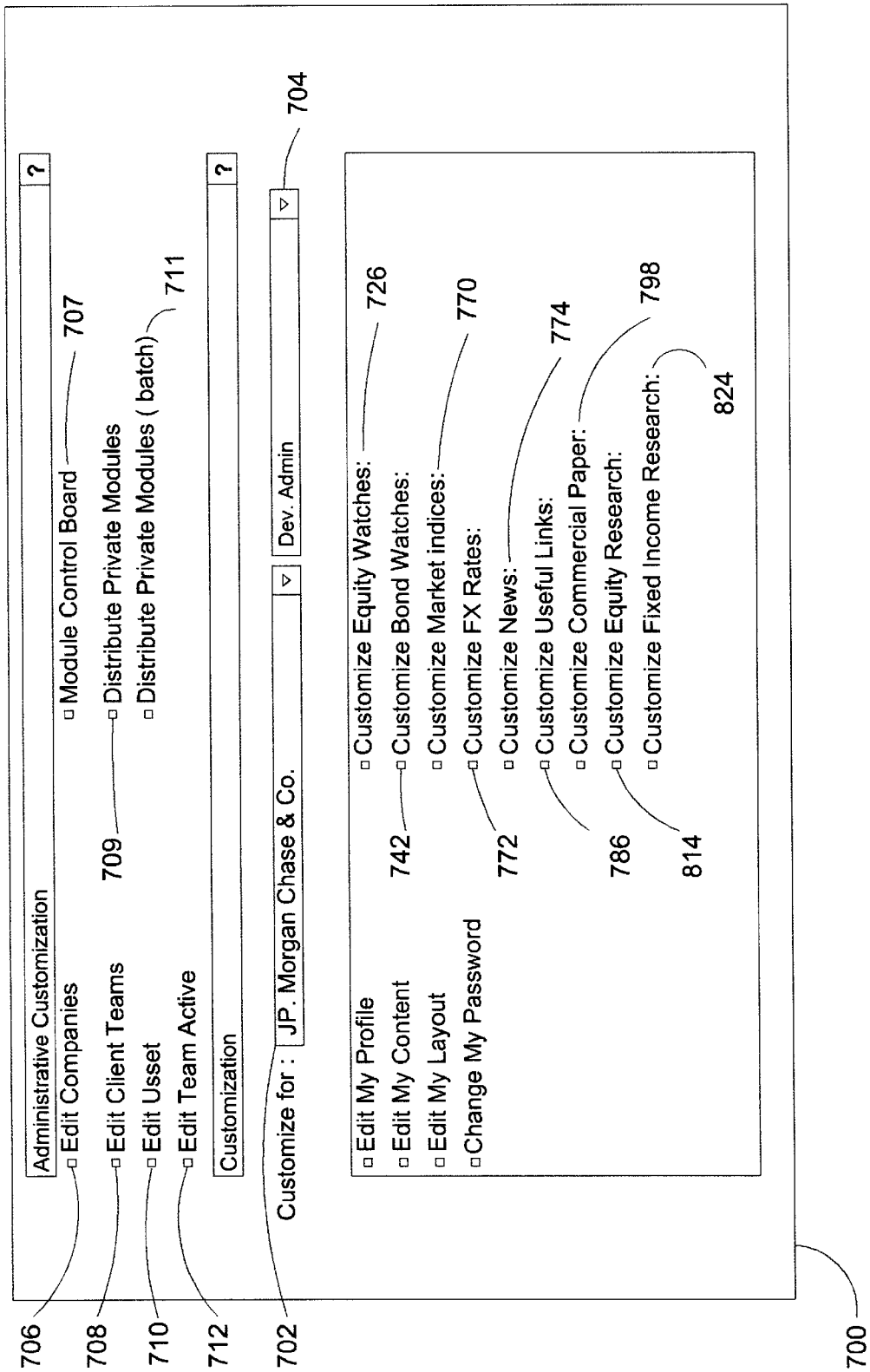
FIG. 7 shows a customization feature access window according to an aspect of the invention.

When the user is recognized as an internal user, a Customization window 700 is displayed which includes a group of administrative customization features as shown in FIG. 7. Two drop-down menus 702, 704 also appear in the Customization window 700. The first drop-down menu 702 includes a list of companies, from which the internal user can select a company. The second drop-down menu 704 includes a list of users for the company that is selected by the internal user. Once a user is selected, the internal user can create Custom Records for display of data and/or information in the respective modules of the users' portal web page (e.g. 200, FIG. 2). For example, an internal user can customize an equity watchlist for a user, and the user can display that watchlist in his/her equity watchlist module, as will be described later.

The administrative customization features, which are only displayed to the internal users, include: Edit Companies 706, that allows addition, edit or deletion of a company's profile and information relating thereto; Edit Client Teams 708, that allows the addition or deletion of an authorized internal user for a company; Edit Users 710, that allows addition, edit or deletion of profiles for external users; and Edit Team Advice 712, that enables the authorized internal users to post information in the Team Advice module of the selected external user's portal web page; Module Control Board link 707 which allows the administrator to set the accessibility status of each module; Distribute Private Modules link 709 which allows the administrator to grant permissions to individual users to access private module; and Distribute Private Modules (Batch) link 711 which allows the administrator to grant permissions to users on a batch basis as will be described later.

When the Edit Team Advice 712 is clicked, the internal user is provided with a form 714 as shown in FIG. 7a. This form includes a dropdown menu 716 that lists all of the companies to which the internal user is authorized. Once a selection is made from this list, the system displays a list of all the external users 510 for that company. The internal user can then select the name of an external user for the selected company from the list of external users in a display box 718. The internal user can then enter text in the message box 515. This form also allows the internal user to enter a date beyond which the message will not be displayed on the user's portal web page. The date is entered in a plurality of boxes 722 in which the date is entered. By pressing the Update Client Team Advice button 724, the customization database (115, FIG. 1) will be updated with the advice. Thereafter, when the external user whose Client Advice module (228, FIG. 2h) was updated logs onto the system his/or her Team Advice module (228, FIG. 2h) displays the message that was typed into the message box 515.

As previously stated, the administrative customization features are only made available to internal users. If the system recognizes that the user is an external user, the Administrative Customization functions are omitted from the Customization window 700, and only the Customization functions that are shown in FIG. 7 under customization are displayed to the user.

Referring to FIG. 7, the Customize Equity Watchlist function allows authorized users to add, edit or delete watchlists on a shared basis. This function may be accessed by clicking on Customize Equity Watchlist link 726. When this link is clicked Equity Watchlist customization window 728 is provided to the user as shown in FIG. 7b. This window includes a drop down menu 730 from which the user can select to edit an existing watchlist, to create a new or delete an existing watchlist. If the user selects to edit or delete an existing watchlist he may select the watchlist by its name from drop-down menu 732. If the user selects to add a new watchlist, a new window (not shown) is provided so that the user may enter a name for the new watchlist. Preferably, a text edit box 734 is provided which displays the name of an existing watchlist and allows the name to be edited. A plurality of entry boxes (e.g. 736, 738) are provided for the user to enter or delete ticker symbols for stocks to edit an existing Watchlist. Optionally, a symbol look up function (not shown) may be incorporated in window 728 to allow the user to find stocks more easily. When submit button 740 is clicked the selected watchlist may be edited or deleted as the case may be. The information in the form is submitted to the customization database (115, FIG. 1) by clicking on a submit button.

The Customize Bond Watchlist function is used to specify groups of bonds that are viewed in the Bond Watchlist module (210, FIG. 2*b*) along with respective data relating to each bond. This function may be accessed by clicking on Customize Bond Watchlist link 742. When clicked, the Bond Watchlist customization window 744 shown in FIG. 7*c* is presented to the user. This window includes a Search Criteria Development module 746, Search Results Area 748 and a Current Bond Watchlist area 750. The user can search for bond issues using the following: an issuer name entered into the Issuer Name box 752; coupon range selected from coupon range boxes 754*a*, 754*b*; Moody's rating, selected from the Moody's Rating boxes 756*a*, 756*b*; S&P rating, selected from the S&P Rating boxes 757*a*, 757*b*; country of issue, selected from the Country list 758; currency, selected from the Currency list 760; industry selected from the Industry list 762; and maturity range selected using maturity range boxes 764*a*, 764*b*.

The user submits the search criteria specified in the Search Criteria Development module 746, which returns the search results in the Search Results Area 748. The user then can select any one or a group of the bonds that are found through the search in order to add the same to a Current Bond Watchlist 750. The user may also delete any of the bonds in the Current Bond Watchlist 750 by marking its check box (e.g. 766). By clicking on the Update button 768 the Current Bond Watchlist is updated.

Referring to FIG. 7, the Customize Market Indices function can be used to select the market indices that are displayed in the Market Watch module (214, FIG. 2*d*) of the external user's web page 200 and their sequence of display.

To access this function, the user can click on Customize Market Indices link 770. Once clicked, the user is provided with a customization form, which includes four drop-down menus (not shown). The user may select one index from each drop-down menu. Each drop-down menu includes a list of indices from various market exchanges. The list preferably includes the following indices: Dow Jones Industrial Average; Dow Jones Transportation; Dow Jones Utilities; Dow Jones Composite; New York Stock Exchange Composite; New York Stock Exchange Financial; New York Stock Exchange Industrials; New York Stock Exchange Transportation; New York Stock Exchange Utilities; NASDAQ Composite; NASDAQ 100; S&P 500; S&P 100; S&P 400 Mid Cap; Russell 2000; Wilshire Small Cap; Pacific Exchange High Tech; and AMEX Composite. By clicking on an update button provided in this window, the customization database (115, FIG. 1) is updated according to the selections. Thereafter, the Market Watch module (214, FIG. 2*d*) of the user's portal web page displays these selections.

An authorized user may also customize the foreign exchange rates which appear in the FX Rates module (218, FIG. 2*e*). Preferably, four foreign currencies are viewed in the FX Rates module 235 at any given time. These four currencies can be selected from a list of one hundred and eighty five currencies, which includes preferably the following: American Dollar; British Pound; Japanese Yen; Euro; German Mark; Swiss Franc; Canadian Dollar; Mexican Peso; Brazilian Real; and Russian Ruble. Preferably, a default set of foreign currencies such as American Dollar, British Pound, Japanese Yen, and Euro is set by the administrator.

Referring to FIG. 7, when the Customize FX Rates link 772 is clicked by an authorized user, a customization form (not shown) is presented to the user. This customization window preferably includes four drop-down menus from which the user may select the foreign currencies. By clicking on an update button provided in the window, the customization database (115, FIG. 1) is updated with the selections. Thereafter, the FX Rates module displays cross rates for these selected currencies.

Figure 7D:
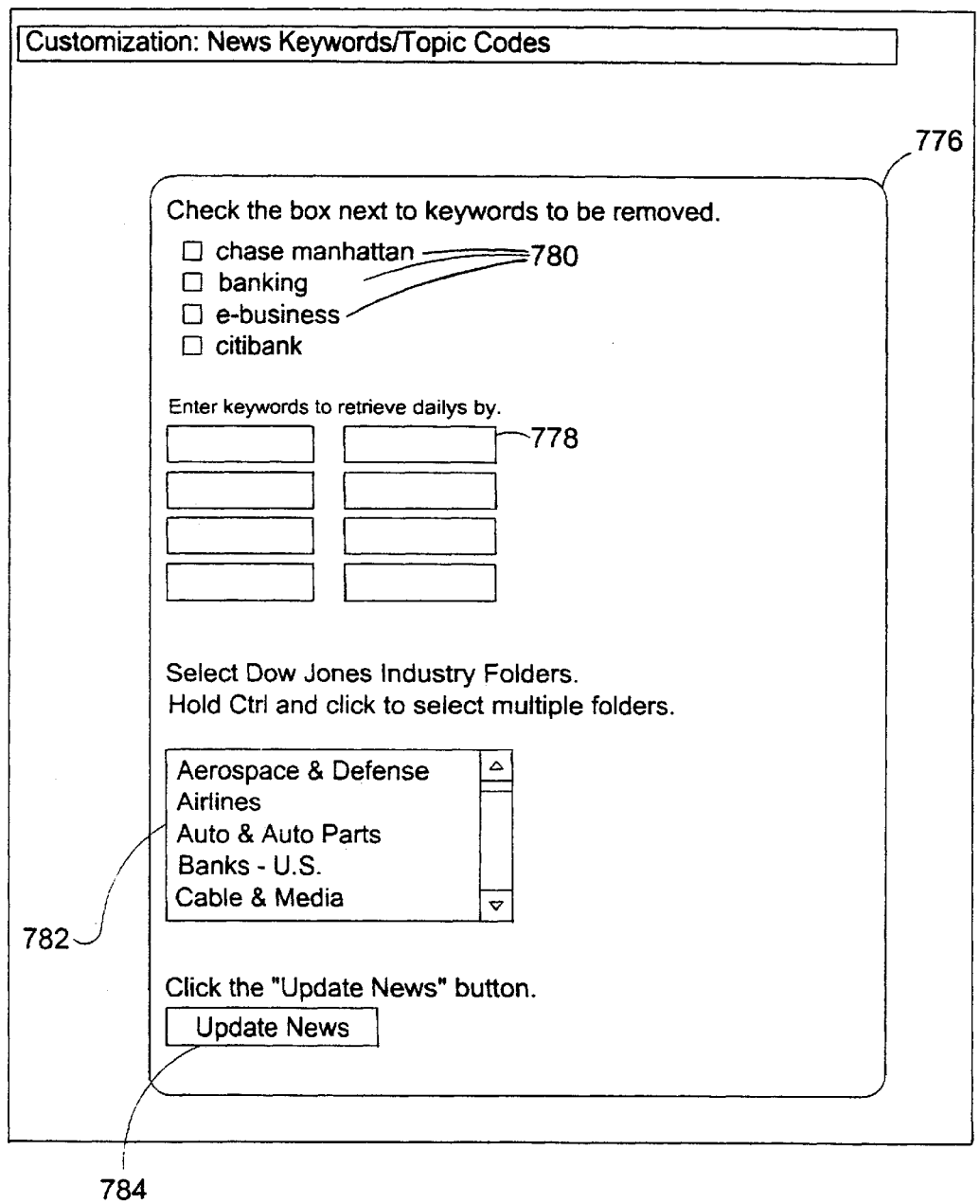

An authorized user can also customize the News module (216, FIG. 2*c*) by using the Customized News link (774, FIG. 7). When this link is clicked, the user is provided with a News customization window 776 such as the one shown in FIG. 7*d*. Window 776 preferably includes entry boxes (e.g. 778) for keywords that are to be searched, a list of current keywords 780 that the user may select or delete, and a list of folders appearing in a selection box 782 that are to be searched using the keywords. More than one folder may be selected by the user. By clicking on the Update News button 784, the selected keywords are submitted to the customization database (115, FIG. 1). Thereafter, each time the external user logs on, the selected folders are searched and the results of the search is displayed in NEWS module (216, FIG. 2*c*).

Figure 7E:
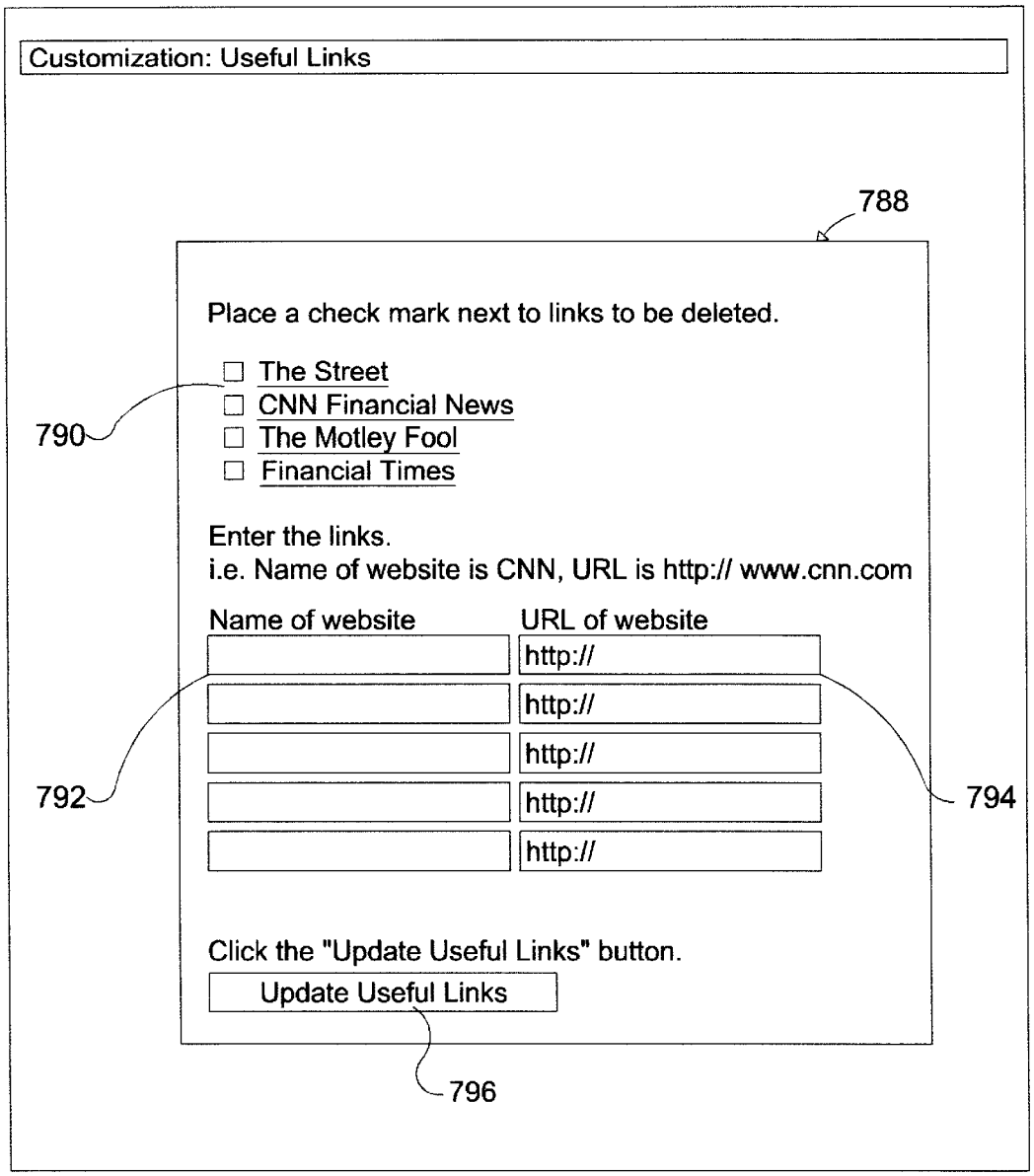

The Useful Links module (220, FIG. 2*f*) can be customized when the Customize Useful Links link 786 (FIG. 4) is clicked. Once clicked, a form 788 is presented to the user as shown in FIG. 7*e*. Form 788 includes the list of existing links each being associated with a check box 790 and a number of entry boxes (e.g. 792) for the entry of the name of the website to be displayed as a link in Useful Links module (220, FIG. 2*f*), and an associate entry box (e.g. 794) for the entry of the website's domain name. When a user places a check mark in the check box associated with an existing link, that link is removed from the Useful Links module (220, FIG. 2*f*). The customization database (115, FIG. 1) is updated with the entries by the user when the Update Useful Links button 796 is clicked.

Commercial Paper Statement module (225, FIG. 2*k*) can be customized by clicking Customized Commercial Paper link 798. Once clicked, a commercial paper customization window 800 will be provided to the user as shown in FIG. 7*f*. Window 800 includes a Select the Company drop-down menu 802, from which an external user's company may be selected; a Select the User drop-down menu 804 from which a user may be selected; a list of programs each associated with a selection box (e.g. 806) so that the user may select one or a plurality of programs; a Select the Default Program drop-down menu 808 from which a program may be selected as a default program; and Select a Default Date Range to Present drop-down menu 810 for selecting a default duration of time. Once the selection is made, Submit button 812 is clicked. Once Submit button 812 is clicked, a Custom Record is created from the selections and the customization database is updated.

Figure 7G:
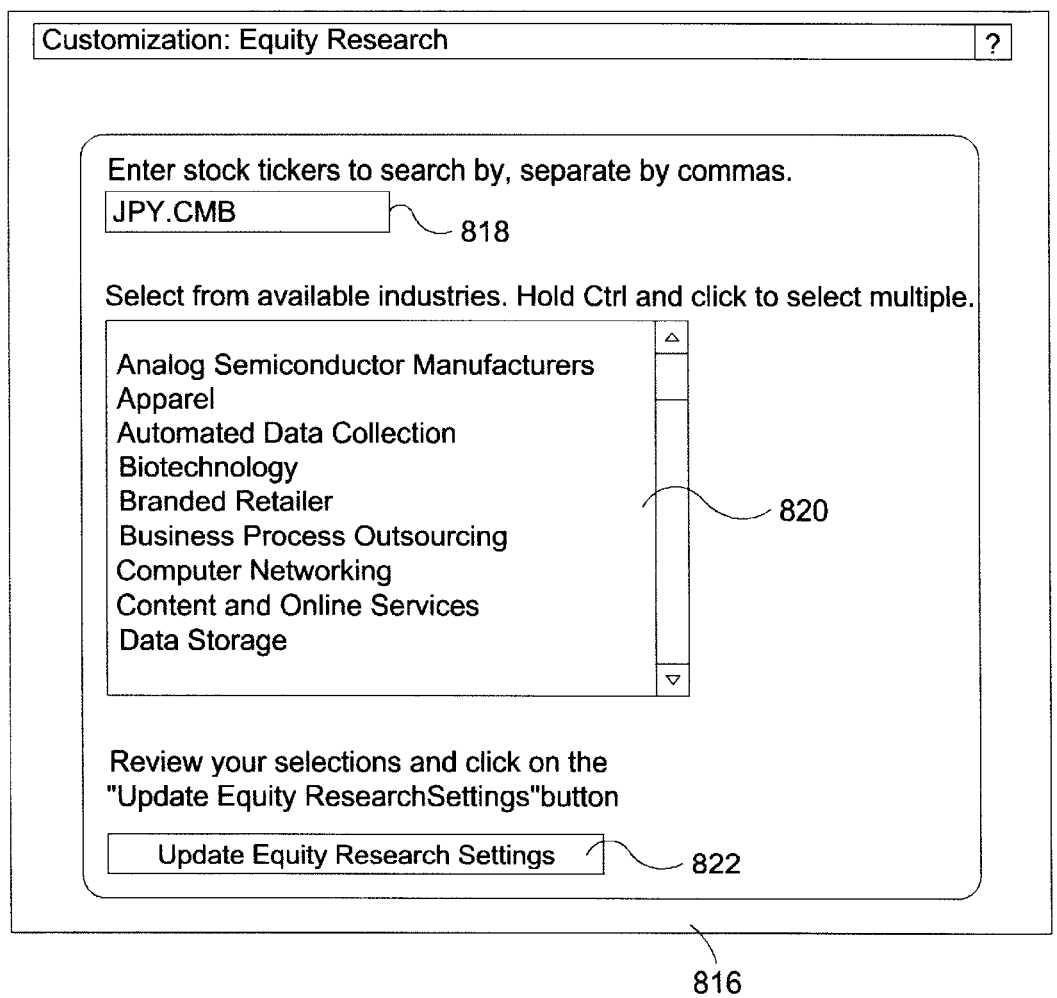

Equity Research Module (227, FIG. 2*m*) can be customized by clicking on Customize Equity Research link (814, FIG. 7). Once clicked, an Equity Research Customization window 816 is provided to the user as shown in FIG. 7*g*. Window 816 includes: a Search box 818 in which ticker symbols for the stocks may be entered; an industrial category selection box 820 containing a list of various industrial categories in which the search is performed; and an Update Equity Research Settings, clicking of which will provide the customization database with a Custom Record that is used to retrieve information for the Equity Research Module (227, FIG. 2*m*)) when the user logs on.

Figure 7H:
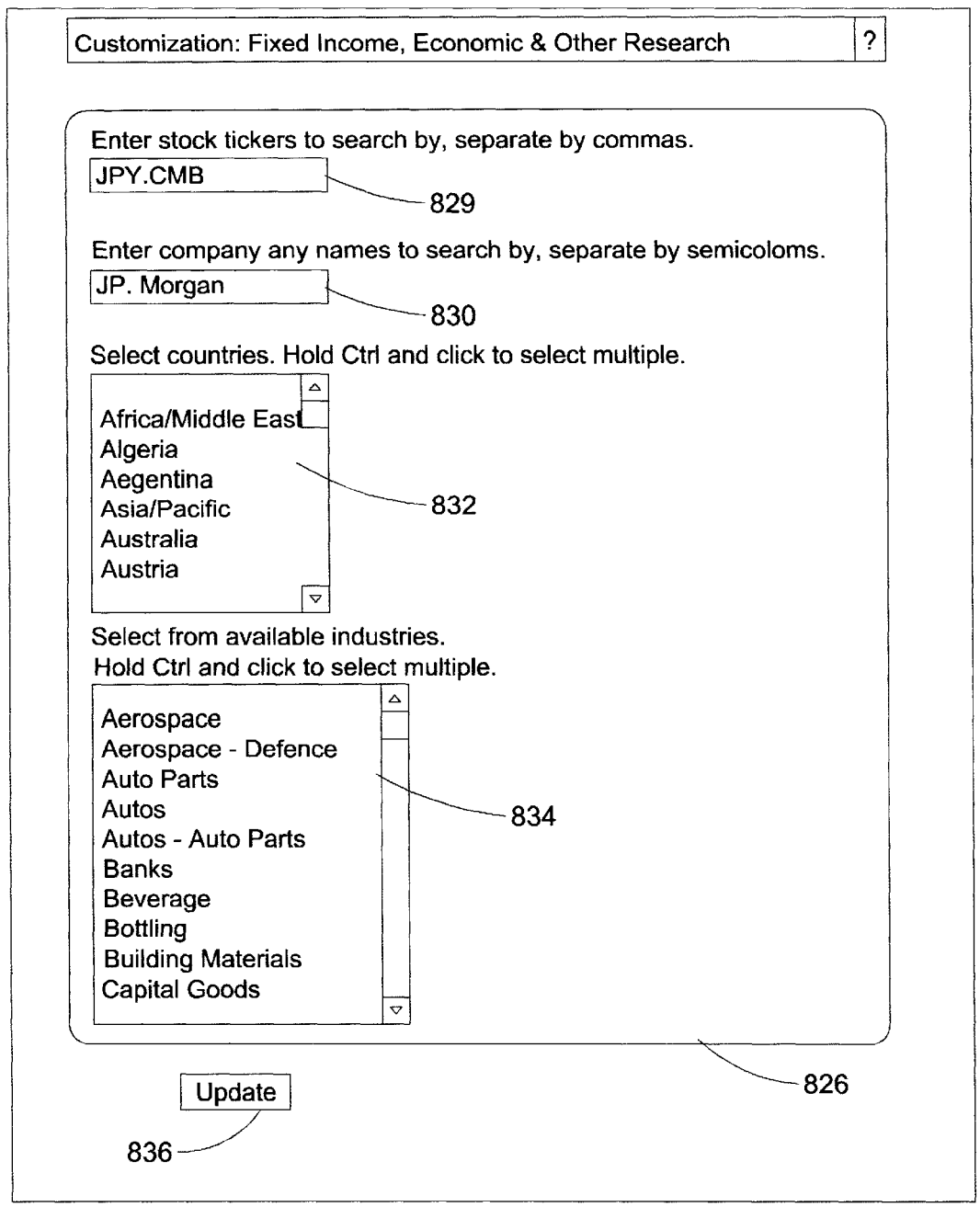

Fixed Income, Economic & Other Research module (229, FIG. 2n) can be customized by clicking on Customize Fixed Income Research link (824, FIG. 7). Once clicked, a Fixed Income customization window 826 is provided to the user, as shown in FIG. 7h. Window 826 includes: a search box 828 in which ticker symbols for stocks may be entered; a company name search box 830 in which names of companies used in a search are entered. A Country Selection box 832 which lists a number of countries that can be selected; an Industrial Category Selection box 834 containing a list of various industrial categories in which the search is performed; and an Update button 836, clicking of which will provide the customization database with a Custom Record that is used to retrieve information for the module when the user logs on.

According to another aspect of the invention, the display modules may be made accessible to all users, may be restricted and accessible if permission is granted by the administrator of the system, may be turned off and thus inaccessible to all users, and may be made mandatory so that it will appear in portal web pages of the users whether selected by the users or not.

FIG. 8 shows a window 838, only accessible by an administrator of the system by clicking on Module Control Board link (707, FIG. 7), which is used to set the status of each module. Window 838 includes a list of all the modules. Each module is associated with a respective public button (e.g. 840), private button (e.g. 842), OFF button (e.g. 844), and a Req'd button (e.g. 846). When a public button (e.g. 840) is selected for a module, that module is made accessible to all users. When a private button (e.g. 842) is selected for a module, that module is restricted unless permitted by the administrator of the system. Permission is granted by the administrator of the system as will be described later. When the OFF button (e.g. 844) is selected for a module, that module is turned off and is thus inaccessible to all users. When Req'd button (e.g. 846) is selected for a module, that module will appear on the portal web pages of users, whether selected or not. Once the status of each module is set by the administrator, the selections are saved by clicking on Save Changes 848.

As mentioned above, modules that have been assigned a private status may only be accessed if permitted. An administrator may permit an individual user or a group of users to access a module that has a private status.

FIG. 9 shows a module 850, accessible only by an administrator by clicking on Distribute Private Modules link (709, FIG. 7), for assigning a permission to an individual user to access a module having a private status. Module 850 includes: a Select a Company drop-down menu 852 from which an administrator can select a company, a Select User drop-down menu 854 from which an administrator can select a user; and a list of modules each associated with a selection check box (e.g. 856). To grant permission to an individual user, the administrator, once the user has been selected, can select a module (or a plurality of modules) by placing a check inside its associated selection check box. The grant of the permission is then saved by clicking on the Save Permission button 858. Once permission is granted to a user, the user may select the module for his/her portal web page.

An administrator can give permission to a group of users to access a private module.

According to an aspect of the invention, the administrator may "batch" a group of users and give permission to the batch of users.

Figure 10:
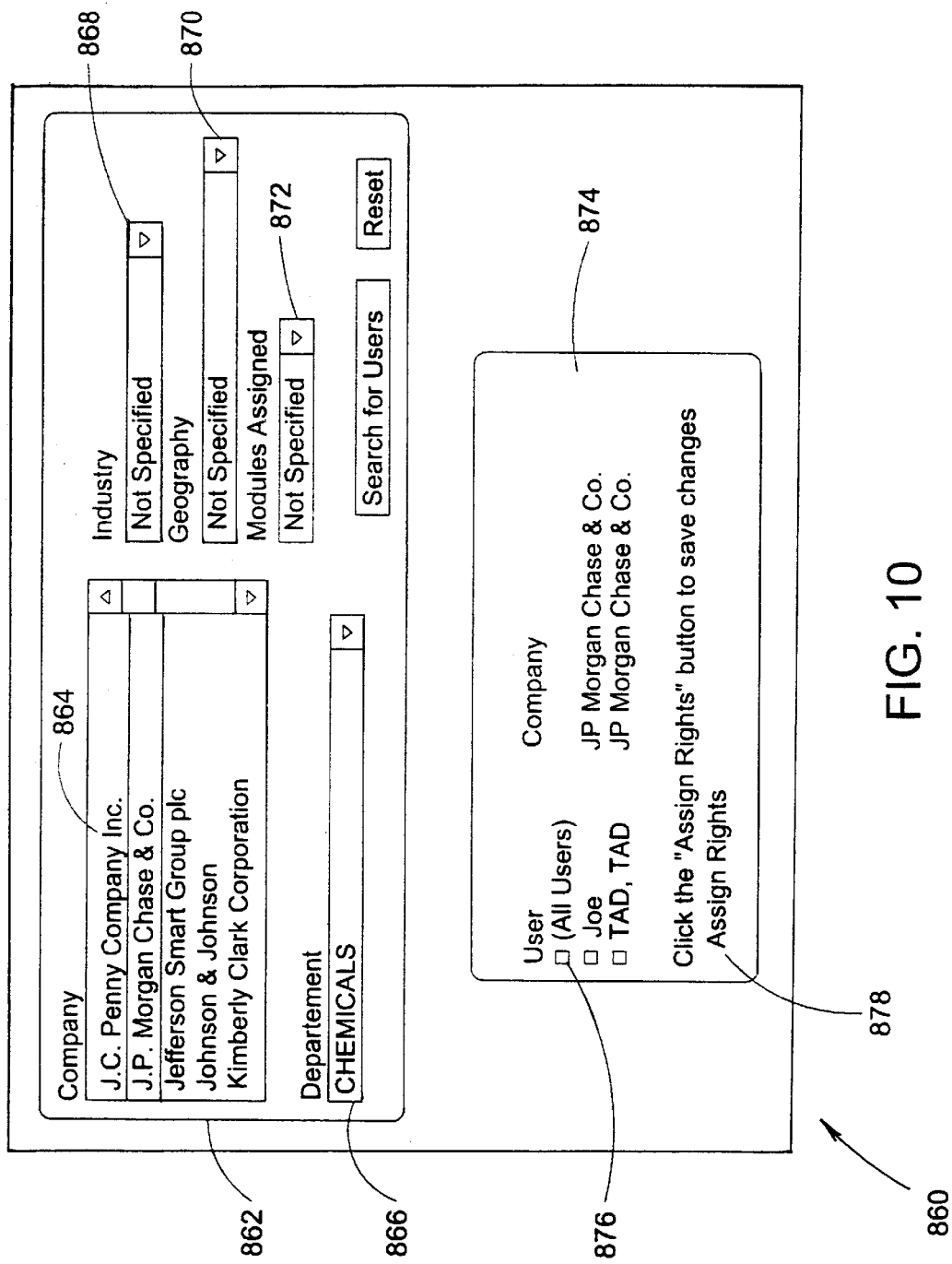
FIG. 10 shows a customization control window for distributing access rights to users to restricted information display modules on a batch basis.

FIG. 10 shows a module 860, accessible to the administrator only by clicking on Distribute Private Modules (Batch) line (711, FIG. 7), by which a group of users may be "batched" and assigned permission to access one or more private modules. Module 860 includes a Search Sub-module 862. Search Sub-module 862 includes: a Company Selection box 864 which contains a list of companies which can be selected; a Department 866 dropdown menu from which a department within a company may be selected; an Industry drop-down menu 868 from which an industry can be selected; a Geography drop-down menu 870 from which a geographical location may be selected; and Modules Assigned drop-down menu 872 from which a module may be selected. Once the selections are made, Search for Users button can be clicked to conduct a search for eligible users. The results of the search will then be displayed in Search Results area 874 where eligible users will each be listed. Each user listed in Search Results area 874 will be associated with a check box (e.g. 876). To give rights to a user, the check box (e.g. 876) associated with that user is checked and Assign Rights button 878 is clicked. The assignment of the right to access the private modules will then be saved and the user benefiting from the assignment may include the private module in his/her portal web page.

Figure 11:
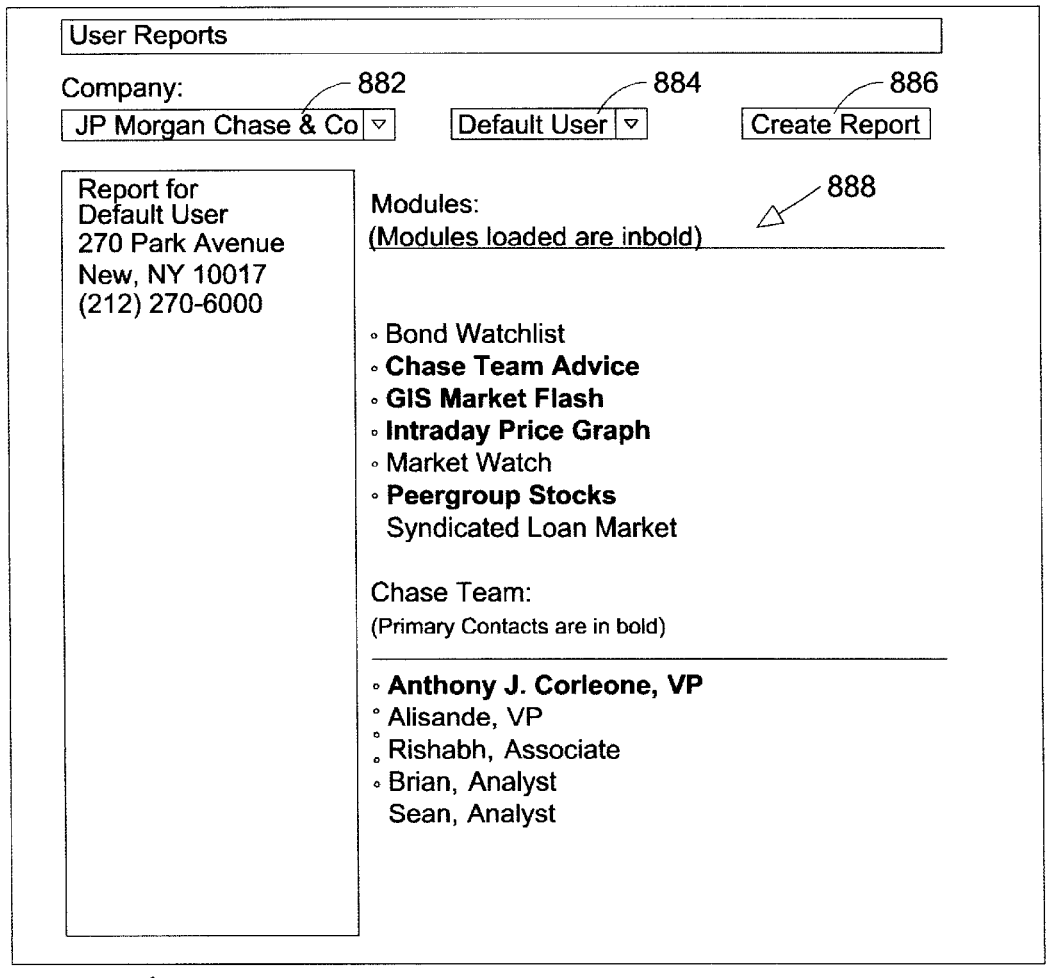
FIG. 11 shows an administrative module for obtaining a report on a user according to an aspect of the invention.

According to another aspect of the invention, the administrator may obtain a report which shows which modules are loaded for a particular user. An example of such a report is shown in FIG. 11. FIG. 11 shows a module 880 for obtaining a report on an individual user. Module 880 includes: a Company drop-down menu 882 from which a company may be selected; a User dropdown menu 884 from which a user within the selected company may be selected; and a Create Report button 886 clicking on which will provide a report in a report area 888. Report area 888 preferably shows a list of modules that are located for the selected user in bold, and those that are not loaded in ordinary type Report. Area 888 preferably also includes a list of internal users for the selected external user.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An information system comprising:

a communication network;

a database server operatively connected to said communication network, said database server retrievably storing a plurality of custom records, each of said custom records having a plurality of searching parameters;

a plurality of user stations operatively connected to said communication network, each of said user stations providing an authorized user with access to said database server;

at least one coordinator station operatively connected to said communication network, said at least one coordinator station providing an authorized coordinator with access to said database server;

at least one searchable information source operatively connected to said communication network, said at least one information source containing data that is searchable using at least one of said searching parameters;

wherein only a portion of said custom records may be accessed by an authorized user, said portion of custom records including custom records created and retrievably stored by said authorized user and custom records created and retrievably stored by an authorized coordinator, whereby said portion of said custom records may be created and accessed by an authorized user and an authorized coordinator on a shared basis.

2. The information system of claim 1, further comprising an information server for transmitting information to said plurality of user stations.

3. The information system of claim 2, wherein said information comprises a result of a search of said at least one searchable information source based on said at least one searching parameter.

4. The information system of claim 3, wherein said plurality of user stations each includes a display terminal for displaying said information.

5. The information system of claim 4, wherein each of said records in said portion of records is retrievably stored under a respective unique designation.

6. The information system of claim 4, wherein said information is displayed in an information module displayable by a display terminal.

7. A system for displaying information comprising:
a plurality of searchable information sources containing searchable data;
a database server containing a database, said database including a plurality of records, each record including a plurality of searching parameters and having a unique designation, whereby each record can be retrieved by its respective unique designation and used to search at least one of said searchable information sources to obtain a search result;
an information server operatively connected to said database server and said plurality of searchable information sources, said information server being connected to a communication network and capable of transmitting a page containing said search results to a display terminal via said communication network, said page including a plurality of independently modifiable information display modules for displaying information based on said search results, wherein at least one of said information display modules is associated with a respective menu for displaying a plurality of said unique designations as selectable options so that a user may select one of said unique designations to have a search performed based on said searching parameters in said record assigned thereto to obtain a search result to modify based thereon said information displayed in said associated display module.

8. A system according to claim 7, wherein said page is a web page.

9. A system according to claim 8, wherein said web page includes automatically updateable information display modules.

10. A system according to claim 7, wherein said modules include a plurality associated selectable functional buttons.

11. A system according to claim 10, wherein at least one of said buttons activates a function for constructing a graphical display of said information.

12. A system according to claim 10, wherein at least one of said buttons activates a function for expanding the scope of said information displayed in said modules.

13. A system according to claim 12, wherein said database further includes records containing parameters uniquely associated with an individual user, said parameters being used to customize the contents of a page for said individual user.

14. A system according to claim 13, wherein said database includes a record containing a parameter for displaying a message to said individual user inside an information module in said page for a designated period of days.

15. A system according to claim 14, wherein said system includes a feature for preventing the display of said message on an expiration date.

16. A system according to claim 14, wherein said designated period of days is adjustable.

17. A system for displaying information in a web page comprising:
a plurality of information sources;
a database containing custom records, each custom record containing at least one search parameter for searching at least one of said plurality of information sources, wherein at least a first portion of said custom records is accessible and modifiable only by a first user and a coordinator, and a second portion of said custom records is accessible and modifiable only by a second user and said coordinator, said coordinator and said first user and said coordinator and said second user having access to said first portion and said second portion respectively on a shared basis; and
an information server operatively connected to a plurality of user stations via a network to receive requests for information from each one of said user stations and transmit information to each one of said user stations, each one of said user stations being associated with a respective display terminal for displaying a web page;
wherein said information server may transmit code to each of said plurality of user stations to display a portal web page via a respective display terminal associated with each of said plurality of user stations, said portal web page including a plurality of information display modules each for displaying information to a user, said information being compiled based on searching at least one of said information sources using at least one search parameter, said plurality of information display modules including modules for displaying information compiled based on search parameters in custom records that are accessible on a shared basis, and information display modules for displaying information compiled based on search parameters in custom records that are accessible only to said coordinator, said modules for displaying information compiled based on search parameters in custom records that are accessible on a shared basis including a module for displaying information about equities, a module for displaying information about bonds, a module for displaying information about market indices, a module for displaying information about foreign exchange rates, a module for displaying news, a module for displaying a preselected set of hyper-links, and said modules for displaying information compiled based on search parameters in custom records that are accessible only to said coordinator including a module for displaying commentaries relating to market conditions, a module for displaying LIBOR and treasury yields, a module for displaying the price and volume movement of a security, a module for displaying a message from said coordinator, a search module for searching the definition of financial terms, a module for providing a country-by-country financial news, and a scrolling ticker for displaying ticker symbols for stocks and their respective price and volume trade in the market.

* * * * *